United States Patent [19]
Masuda et al.

[11] Patent Number: 5,686,552
[45] Date of Patent: Nov. 11, 1997

[54] POLYESTER COMPOSITIONS, POLYESTER MONOFILAMENTS; PROCESS FOR PRODUCTION THEREOF AND PRODUCTS EMPLOYING POLYESTER MONOFILAMENTS

[75] Inventors: Toyohiko Masuda; Yoshinori Horii, both of Shizuoka; Tadanori Iwama, Okazaki, all of Japan

[73] Assignees: Toray Industries, Inc.; Toray Monofilament Co., Ltd., both of Japan

[21] Appl. No.: 525,599

[22] PCT Filed: Jan. 27, 1995

[86] PCT No.: PCT/JP95/00105

§ 371 Date: Sep. 20, 1995

§ 102(e) Date: Sep. 20, 1995

[87] PCT Pub. No.: WO95/21218

PCT Pub. Date: Aug. 10, 1995

[30] Foreign Application Priority Data

Feb. 2, 1994 [JP] Japan ..................................... 6-011117
Nov. 16, 1994 [JP] Japan ..................................... 6-282263

[51] Int. Cl.⁶ .................................................. C08G 63/02
[52] U.S. Cl. ........................... 528/193; 528/176; 528/194
[58] Field of Search ........................... 528/176, 193, 528/194

[56] References Cited

U.S. PATENT DOCUMENTS 3,975,329  8/1976  Barnewall et al. .................... 525/437

FOREIGN PATENT DOCUMENTS

| 0197789 A2 | 10/1986 | European Pat. Off. . |
| 51-136923 | 11/1976 | Japan . |
| 58-23916 | 2/1983 | Japan . |
| 94-261137/32 | 9/1991 | Rep. of Korea . |
| WO 83/01253 | 4/1983 | WIPO . |

*Primary Examiner*—Terressa Mosley
*Attorney, Agent, or Firm*—Austin R. Miller

[57] ABSTRACT

A polyester composition with a polymer component which contains 99.8–60 wt % of a polyester with a terminal carboxyl group concentration of not more than 10 equivalents/$10^6$ g (A) and 0.2–40 wt % of a thermoplastic polymer containing no fluorine atoms (B), and which also includes 0.005–1.5 wt % of unreacted carbodiimide compound (C), polyester monofilaments obtained from the composition, an industrial fabric and paper drier canvas which employ the polyester monofilaments, and a rubber mold reinforced with the polyester monofilaments.

The composition is obtained by kneading in the polyester either after or during the process of melting and kneading the thermoplastic polymer containing no fluorine atoms and the carbodiimide compound, and the composition is spun, drawn and thermoset to obtain polyester monofilaments.

16 Claims, No Drawings

POLYESTER COMPOSITIONS, POLYESTER MONOFILAMENTS; PROCESS FOR PRODUCTION THEREOF AND PRODUCTS EMPLOYING POLYESTER MONOFILAMENTS

TECHNICAL FIELD

This Application is a 371 of PCT/JP95/00105 filed Jan. 27, 1995.

The present invention relates to a polyester composition having excellent hydrolysis resistance, to polyester monofilaments and to a process for their production, as well as to products such as industrial fabrics which employ the polyester monofilaments.

BACKGROUND ART

The excellent properties of polyesters have led to their use in various types of industrial parts, clothing and industrial fiber materials, various types of fabrics, etc. However, since polyester resins have the disadvantage of degradation due to hydrolysis undergone in high-temperature and high humidity environments, a variety of different improvements have been applied. For example, polyester compositions with humidity resistance improved by the incorporation of acid-modified polyolefins and epoxy-modified acryl resins have been proposed (Japanese Unexamined Patent Publication (Kokai) No. 63-39956), but the effect of improvement in humidity resistance is insufficient. Furthermore, since polyester monofilaments have excellent tensile strength, acid resistance and dimensional stability, they have found extensive use in papermaking drier canvases, papermaking wire, various brushes, writing brushes, plain gauze for printing screens, fishing lines, rubber-reinforcing fiber materials, and the like. However, when used under conditions such as high heat and moisture which promote hydrolysis, as when employed as a structural material or tire cord, or in a papermaking drier canvas, polyester monofilaments undergo a reduction in strength due to hydrolytic degradation, and therefore they have not been able to withstand long-term use. As a result, a number of methods have been proposed for eliminating the drawbacks of such polyester monofilaments.

One known means of improving the resistance to hydrolysis of polyester monofilaments is the production of monofilaments using a polyester containing a specific amount of a polyolefin such as polyethylene, polypropylene, polybutene, poly-4-methylpenten-1 or polystyrene (Japanese Unexamined Patent Publication (Kokai) No. 51-136923), but the monofilaments obtained by this technique, for example monofilaments comprising polyethylene-containing polyethylene terephthalate, have low strength and a low effect of improvement in resistance to hydrolysis, and are thus impractical.

There are also known methods of improving resistance to hydrolysis of polyesters by the addition of epoxy compounds. Such known methods include a method of adding a monoglycidyl ether to polyester (Japanese Examined Patent Publication (Kokoku) No. 44-27911), a method of adding a glycidyl phthalimide to polyester (Japanese Examined Patent Publication (Kokoku) No. 61-4843), a method of adding an epoxy compound to polyester in the presence of an alkali metal salt (Japanese Unexamined Patent Publication (Kokai) No. 51-134789) and a method of adding an epoxy compound to polyester in the presence of an alkaline earth metal salt (Japanese Examined Patent Publication (Kokoku) No. 61-42728), and although these provide the effects of improving resistance to hydrolysis, the excellent resistance to hydrolysis presently sought has not been satisfied.

There are also known methods of improving the resistance to hydrolysis of polyesters by the addition of oxazoline compounds. For example, there are known methods of adding specific oxazolines to polyesters (Japanese Examined Patent Publication (Kokoku) Nos. 63-8133, 61-48531, 61-57182, 61-48532 and Japanese Unexamined Patent Publication (Kokai) No. 57-161122), and although these provide the effects of improving resistance to hydrolysis, the excellent resistance to hydrolysis presently sought has not been satisfied.

There are also known methods of improving the resistance to hydrolysis of polyesters by the addition of carbodiimide compounds. For example, there have been proposed various methods including a method of adding a mono- or bis-carbodiimide compound and rapidly mixing and spinning to form filaments which contain no unreacted carbodiimide (Japanese Unexamined Patent Publication (Kokai) No. 50-95517), a method of adding a polycarbodiimide compound with three or more carbodiimide radicals in the molecule (Japanese Examined Patent Publication (Kokoku) No. 38-15220), and polyester fibers and filaments whose terminal carboxyl groups are capped by reaction with carbodiimide, and which contain 30–200 ppm of a free mono- and/or bis-carbodiimide compound and at least 0.02 wt % of a reaction product containing a free polycarbodiimide or a more reactive polycarbodiimide radical (Japanese Unexamined Patent Publication (Kokai) No. 4-289221). The present inventors have also offered various improvements by proposing a polyester monofilament for papermaking canvas which retains a specific amount of a specific unreacted carbodiimide compound (Japanese Unexamined Patent Publication (Kokai) No. 58-23916), a method of producing an industrial grade polyester filament having a specific carbodiimide compound incorporated in a polyester containing a specific amount of phosphorus atoms (Japanese Unexamined Patent Publication (Kokai) No. 57-205518), and a polyester monofilament with terminal carboxyl groups in a concentration of no more than 10 equivalents/$10^6$ g of polyester, containing 0.005–1.5 wt % of unreacted carbodiimide compound and 0.01–30 wt % of a fluoropolymer (International Patent Disclosure No. WO92/07126). However, in recent years the conditions under which polyester monofilaments for papermaking drier canvases and the like are used have become more and more stringent, and thus polyester monofilaments have been desired which have even greater resistance to hydrolysis such as has been unobtainable with the prior art techniques described above.

Although polyester compositions blended with various types of cyclic olefin polymers are publicly known by Japanese Unexamined Patent Publication (Kokai) Nos. 2-41342, 2-80444, 2-232246, 3-126755, 3-203950 and 4-353557, these publications do not teach in any way polyester monofilaments of the present invention, the effect of the amount of terminal carboxyl groups in the polyester, the addition of unreacted carbodiimide compound to the polyester, or the use of such polyester monofilaments.

DISCLOSURE OF THE INVENTION

In light of the needs mentioned above, it is an object of the present invention to provide a polyester composition and polyester monofilament with even more excellent resistance to hydrolysis than compositions of the prior art, and to provide a method of producing them, as well as various types of industrial fabrics, papermaking drier canvases and rubber molds which employ such polyester monofilaments.

In order to achieve this object, the present invention provides a polyester composition wherein the polymer component contains 99.8–60 wt % of a polyester with a terminal carboxyl group concentration of not more than 10 equivalents/$10^6$ g (A) and 0.2–40 wt % of a thermoplastic polymer containing no fluorine atoms (B), and wherein the polymer component also includes 0.005–1.5 wt % of unreacted carbodiimide compound (C), as well as a polyester monofilament which contains the polyester.

The above-mentioned polyester composition according to the present invention may be produced by a method which includes melting and kneading the thermoplastic polymer containing no fluorine atoms with the carbodiimide compound, and melting and kneading the polyester either during that process or thereafter.

The above-mentioned polyester monofilament according to the present invention may be produced by a process which includes spinning, drawing and thermosetting a polyester composition obtained by the method described above.

According to the present invention there are provided industrial fabrics such as papermaking drier canvases employing the above-mentioned polyester monofilaments of the present invention in at least the warp or weft which compose the fabric, as well as rubber molds reinforced with such polyester monofilaments.

BEST MODE FOR CARRYING OUT THE INVENTION

Of the polymer component of the polyester composition and polyester monofilaments of the present invention, the basic composition of the polyester with a terminal carboxyl group concentration of not more than 10 equivalents/$10^6$ g (A) is a polyester consisting of a dicarboxylic acid and glycol. The dicarboxylic acid component may be terephthalic acid, 2,6-naphthalenedicarboxylic acid, isophthalic acid, 1,4-cyclohexanedicarboxylic acid, or the like. The glycol component may be ethylene glycol, propylene glycol, tetramethylene glycol, 1,4-cyclohexane dimethanol, or the like. If desired, a part of the above-mentioned dicarboxylic acid component may be substituted by adipic acid, sebacic acid, dimer acid, or sulfonic acid metal salt-containing isophthalic acid, etc., and part of the above-mentioned glycol component may be substituted by diethylene glycol, neopentyl glycol, 1,4-cyclohexanediol, 1,4-cyclohexanedimethanol, polyalkylene glycol, or the like. These may also be combined with a small amount of a chain-branching agent such as pentaerythritol, trimethylol propane, trimellitic acid, trimesic acid or boric acid.

Preferred of these is polyethylene terephthalate (hereunder, PET) of which at least 90 mol % of the dicarboxylic acid component is terephthalic acid and 90 mol % of the glycol component is ethylene glycol.

The polyester may also contain, in addition to particles of various inorganic substances such as titanium dioxide, silicon oxide, calcium carbonate, silicon nitride, clay, talc, kaolin, zirconium acid, crosslinked macromolecular compounds and particles of various metals, also any publicly known antioxidants, metal ion sequestering agents, ion exchangers, antistaining agents, light-resisting agents, inclusion compounds, antistatic agents, coloring agents, waxing agents, silicone oils, surfactants, reinforcing fibers, or the like.

The limiting viscosity of the polyester is normally at least 0.6, and it is preferably at least 0.7 for particularly superior strength. The limiting viscosity referred to here is the limit of viscosity measured in an orthochlorophenol solution at 25° C., and is expressed as [η].

The thermoplastic polymer containing no fluorine atoms (B) which is used in the polyester composition and polyester monofilaments of the present invention is any thermoplastic polymer other than the above-mentioned polyester, and examples thereof include polyolefins such as polyethylene, polypropylene, polymethylpentene and cyclic olefin polymers; polystyrenes such as polystyrene and poly-p-methylstyrene; polymethacrylate polymers; modified polyolefins such as copolymers of various α-olefins and glycidyl esters of unsaturated acids, etc.; ionomers; ethylene/vinyl copolymers such as ethylene/vinyl chloride copolymer and ethylene/vinyl acetate copolymer; petroleum resins such as terpene resins; polyacetal resins; polymethacrylates; styrene/acrylonitrile copolymers; styrene/maleic anhydride copolymers; styrene/anhydrous maleimide copolymers; coumarone/indene copolymers; polyphenylene ethers; polyphenylene sulfides; polycarbonates; polyamides such as nylon 6 and nylon 66, etc. These polymers may be used either alone or in combinations of 2 or more.

If a polymer containing fluorine atoms, for example a random copolymer of ethylene and tetrafluoroethylene (hereunder, ETFE) is used as the polymer (B), it is impossible to obtain a polyester composition and polyester monofilaments with the very excellent resistance to hydrolysis which is the object of the present invention. Furthermore, obtaining a polyester composition and polyester monofilaments with the very excellent resistance to hydrolysis which is the object of the present invention is impossible even when a polyester as mentioned above is used as the polymer (B).

Of the above-mentioned polymers which may be used as the polymer (B), polystyrenes, polyolefins and polymethacrylate polymers are preferred.

Examples of polystyrenes include atactic polystyrenes, isotactic polystyrenes, syndiotactic polystyrenes, poly-p-methylstyrene, copolymers of styrene and p-methylstyrene and poly-α-methylstyrene polymers.

Examples of polyolefins include cyclic olefin polymers, polyethylene, polypropylene, polymethylpentene, polybutene-1, polypentene, poly-3-methylbutene-1 and poly-4-methylpentene-1. Of these polyolefins, cyclic olefin polymers, polyethylene, polypropylene and polymethylpentene are particularly preferred.

Examples of polymethacrylates include polymethyl methacrylate, polyethyl methacrylate, poly-n-propyl methacrylate, poly-n-butyl methacrylate, poly-n-octyl methacrylate, poly-n-decyl methacrylate and poly-n-tetradecyl methacrylate. Of these polymethacrylate polymers, polymethyl methacrylate is particularly preferred.

An explanation will now be given in regard to the above-mentioned cyclic olefin polymers, which are preferred as the polymer (B). One of the cyclic olefin polymers preferred for use according to the present invention is a random copolymer of an α-olefin of 2 or more carbon atoms and at least one of the cyclic olefins represented by the following general formulas [I] and [II] (hereunder referred to as α-olefin/cyclic olefin random copolymer).

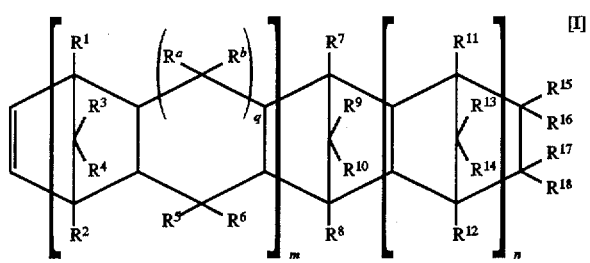

In this general formula [I], n is 0 or 1, m is 0 or a positive integer, q is 0 or 1 and $R^1$–$R^{18}$, $R^a$ and $R^b$ each independently represent an atom or group selected from the group consisting of hydrogen atoms, chlorine atoms, bromine atoms and hydrocarbons, wherein $R^{15}$–$R^{18}$ may be mutually attached to form a monocycle or polycycle which may contain double bonds, and $R^{15}$ and $R^{16}$ or $R^{17}$ and $R^{18}$ may form an alkylidene group.

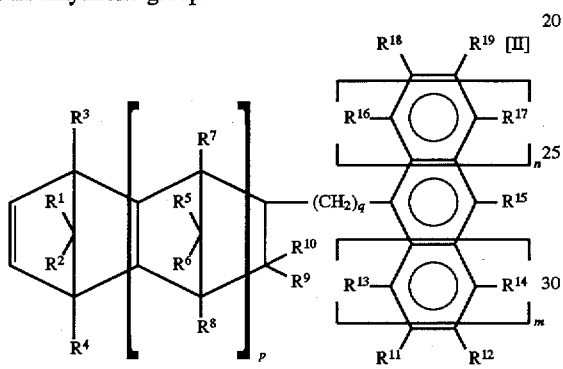

In this general formula [II], p and q are each integers of 0, 1 or more, m and n are each 0, 1 or 2 and $R^1$–$R^{19}$ each independently represent an atom or group selected from the group consisting of hydrogen atoms, chlorine atoms, bromine atoms, aliphatic hydrocarbons, alicyclic hydrocarbons, aromatic hydrocarbons and alkoxy groups, wherein the carbon atom to which $R^9$ is attached and the carbon atom to which $R^{13}$ is attached, or the carbon atom to which $R^{10}$ is attached and the carbon atom to which $R^{11}$ is attached may be attached either directly or via an alkylene group of 1–3 carbon atoms, and when n=m=0, $R^{15}$ and $R^{12}$ or $R^{15}$ and $R^{19}$ may be mutually attached to form a monocyclic or polycyclic aromatic ring.

Such α-olefins of at least 2 carbon atoms composing the α-olefin/cyclic olefin random copolymer include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexane, 3-ethyl-1-hexene, 1-octene, 1-decene, 1-dodecene, 1-tetradecene, 1-hexadecene, 1-octadecene and 1-eicosene. These may be used alone or in any combination.

Of these α-olefins, ethylene is particularly preferred.

The following are cyclic olefins represented by the above general formulas [I] and [II] which compose the above-mentioned α-olefin/cyclic olefin random copolymer.

Namely, bicyclo[2.2.1]hepto-2-ene derivatives, tricyclo[4.3.0 $1^{2,5}$]-3-decene derivatives, tricyclo[4.3.0 $1^{2,5}$]-3-undecene derivatives, tetracyclo[4.4 $0.1^{2,5}.1^{7,10}$]-3-dodecene derivatives, pentacyclo[6.6.1.$1^{3,6}.0^{2,7}.0^{9,14}$]-4-hexadecene derivatives, pentacyclo[6.5.1.$1^{3,6}.0^{2,7}.0^{9,13}$]-4-hexadecene derivatives, pentacyclo[7.4 $0.1^{2,5}.1^{9,12}.0^{8,13}$]-3-pentadecene derivatives, pentacyclopentadecadiene derivatives, pentacyclo[8.4.0.$1^{2,5}.1^{9,12}.0^{8,13}$]-3-pentadecene derivatives, hexacyclo[6.6.1.$1^{3,6}.1^{10,13}.0^{2,7}.0^{9,14}$]-4-heptadecene derivatives, heptacyclo[8.7.0.$1^{3,6}.1^{10,17}.1^{12,15}.0^{2,7}.0^{11,16}$]-4-eicosene derivatives, heptacyclo[8.7.0.$1^{3,6}.1^{10,17}.1^{12,17}.0^{2,7}.0^{11,16}$]-5-eicosene derivatives, heptacyclo[8.8.0.$1^{4,7}.1^{11,18}.1^{13,16}.0^{3,8}.0^{12,17}$]-5-heneicosene derivatives, heptacyclo[8.8.0.$1^{2,9}.1^{4,7}.1^{11,18}.0^{3,8}.0^{12,17}$]-5-heneicosene derivatives, octacyclo[8.8.0.$1^{2,9}.1^{4,7}.1^{11,18}.1^{13,16}.0^{3,8}.0^{12,17}$]-5-docosene derivatives, nonacyclo[10.9.1.$1^{4,7}.1^{13,20}.1^{15,18}.0^{3,8}.0^{2,10}.0^{12,21}.0^{14,19}$]-5-pentacosene derivatives, nonacyclo[10.10.1.$1^{5,8}1^{14,21}.1^{16,19}.0^{2,11}.0^{4,9}.0^{13,22}.0^{15,20}$]-5-hexacosene derivatives, 1,4-methano-1,4,4a,9a-tetrahydrofluorene derivatives, 1,4-methano-1,4,4a,5,10,10a-hexahydroanthracene derivatives and cyclopentadiene-acenaphthylene addition products.

Specific compounds of these include the following. Namely, bicyclo[2.2.1]hepto-2-ene derivatives such as

bicyclo[2.2.1]hepto-2-ene

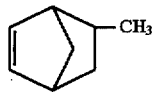

6-methylbicyclo[2.2.1]hepto-2-ene

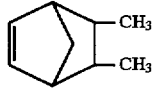

5,6-dimethylbicyclo[2.2.1]hepto-2-ene

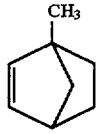

1-methylbicyclo[2.2.1]hepto-2-ene

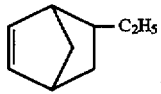

6-ethylbicyclo[2.2.1]hepto-2-ene

6-n-butylbicyclo[2.2.1]hepto-2-ene

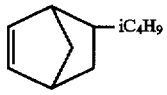

6-isobutylbicyclo[2.2.1]hepto-2-ene and

7-methylbicyclo[2.2.1]hepto-2-ene;

-continued tetracyclo[4.4.0.1^{2,5}.1^{7,10}]-3-dodecene derivatives such as

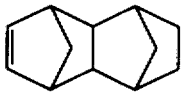

tetracyclo[4.4.0.1^{2,5}.1^{7,10}]-3-dodecene

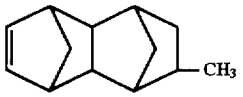

8-methyltetracyclo[4.4.0.1^{2,5}.1^{7,10}]-3-dodecene

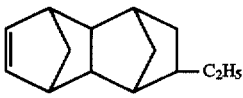

8-ethyltetracyclo[4.4.0.1^{2,5}.1^{7,10}]-3-dodecene

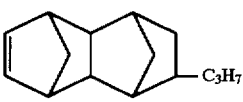

8-propyltetracyclo[4.4.0.1^{2,5}.1^{7,10}]-3-dodecene

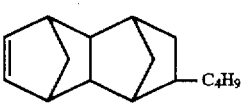

8-butyltetracyclo[4.4.0.1^{2,5}.1^{7,10}]-3-dodecene

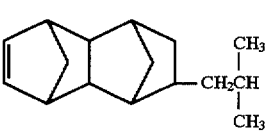

8-isobutyltetracyclo[4.4.0.1^{2,5}.1^{7,10}]-3-dodecene

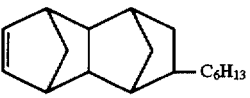

8-hexyltetracyclo[4.4.0.1^{2,5}.1^{7,10}]-3-dodecene

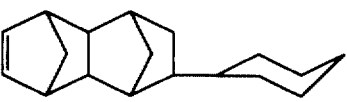

8-cyclohexyltetracyclo[4.4.0.1^{2,5}.1^{7,10}]-3-dodecene

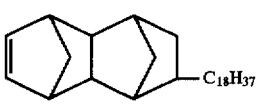

8-stearyltetracyclo[4.4.0.1^{2,5}.1^{7,10}]-3-dodecene

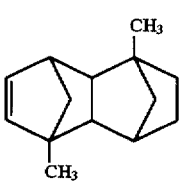

5,10-dimethyltetracyclo[4.4.0.1^{2,5}.1^{7,10}]-3-dodecene

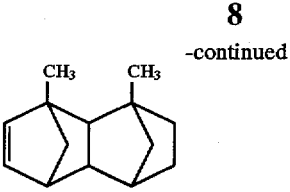

2,10-dimethyltetracyclo[4.4.0.1^{2,5}.1^{7,10}]-3-dodecene

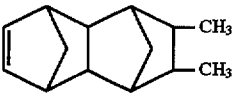

8,9-dimethyltetracyclo[4.4.0.1^{2,5}.1^{7,10}]-3-dodecene

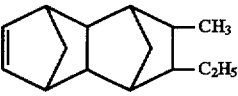

8-ethyl-9-methyltetracyclo[4.4.0.1^{2,5}.1^{7,10}]-3-dodecene

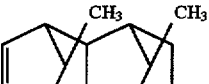

11,12-dimethyltetracyclo[4.4.0.1^{2,5}.1^{7,10}]-3-dodecene

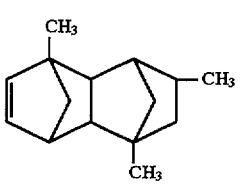

2,7,9-trimethyltetracyclo[4.4.0.1^{2,5}.1^{7,10}]-3-dodecene

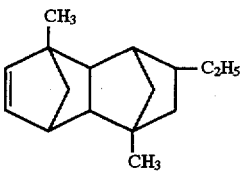

9-ethyl-2,7-dimethyltetracyclo[4.4.0.1^{2,5}.1^{7,10}]-3-dodecene

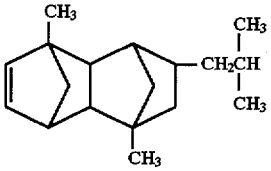

9-isobutyl-2,7-dimethyltetracyclo[4.4.0.1^{2,5}.1^{7,10}]-3-dodecene

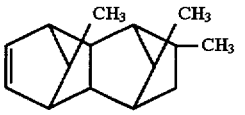

9,11,12-trimethyltetracyclo[4.4.0.1^{2,5}.1^{7,10}]-3-dodecene

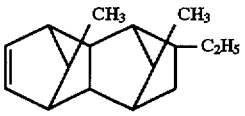

9-ethyl-11,12-dimethyltetracyclo[4.4.0.1^{2,5}.1^{7,10}]-3-dodecene

-continued

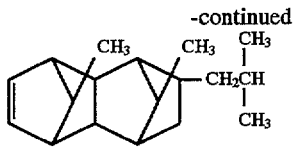

9-isobutyl-11,12-dimethyltetracyclo[4.4.0.1$^{2,5}$.1$^{7,10}$]-3-dodecene

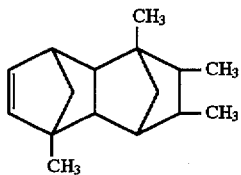

5,8,9,10-tetramethyltetracyclo[4.4.0.1$^{2,5}$.1$^{7,10}$]-3-dodecene

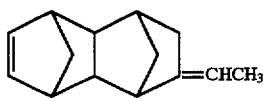

8-ethylidenetetracyclo[4.4.0.1$^{2,5}$.1$^{7,10}$]-3-dodecene

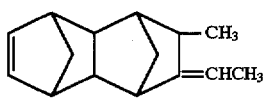

8-ethylidene-9-methyltetracyclo[4.4.0.1$^{2,5}$.1$^{7,10}$]-3-dodecene

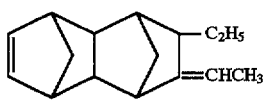

8-ethylidene-9-ethyltetracyclo[4.4.0.1$^{2,5}$.1$^{7,10}$]-3-dodecene

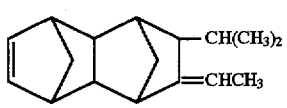

8-ethylidene-9-isopropyltetracyclo[4.4.0.1$^{2,5}$.1$^{7,10}$]-3-dodecene

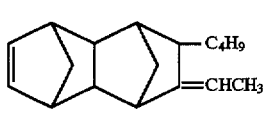

8-ethylidene-9-butyltetracyclo[4.4.0.1$^{2,5}$.1$^{7,10}$]-3-dodecene

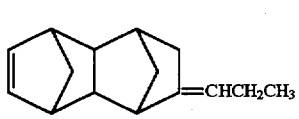

8-n-propylidenetetracyclo[4.4.0.1$^{2,5}$.1$^{7,10}$]-3-dodecene

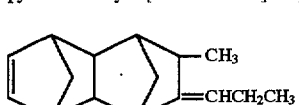

8-n-propylidene-9-methyltetracyclo[4.4.0.1$^{2,5}$.1$^{7,10}$]-3-dodecene

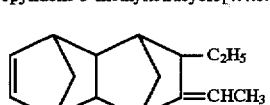

8-n-propylidene-9-ethyltetracyclo[4.4.0.1$^{2,5}$.1$^{7,10}$]-3-dodecene

-continued

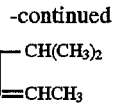

8-n-propylidene-9-isopropyltetracyclo[4.4.0.1$^{2,5}$.1$^{7,10}$]-3-dodecene

8-n-propylidene-9-butyltetracyclo[4.4.0.1$^{2,5}$.1$^{7,10}$]-3-dodecene

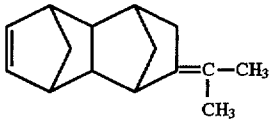

8-isopropylidenetetracyclo[4.4.0.1$^{2,5}$.1$^{7,10}$]-3-dodecene

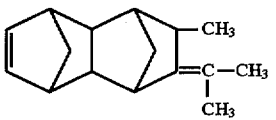

8-isopropylidene-9-methyltetracyclo[4.4.0.1$^{2,5}$.1$^{7,10}$]-3-dodecene

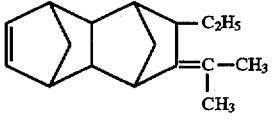

8-isopropylidene-9-ethyltetracyclo[4.4.0.1$^{2,5}$.1$^{7,10}$]-3-dodecene

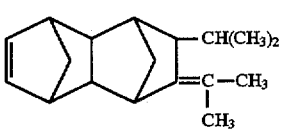

8-isopropylidene-9-isopropyltetracyclo[4.4.0.1$^{2,5}$.1$^{7,10}$]-3-dodecene

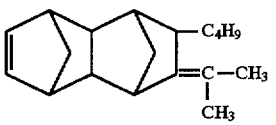

8-isopropylidene-9-butyltetracyclo[4.4.0.1$^{2,5}$.1$^{7,10}$]-3-dodecene

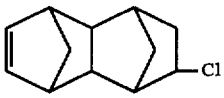

8-chlorotetracyclo[4.4.0.1$^{2,5}$.1$^{7,10}$]-3-dodecene

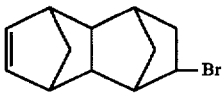

8-bromotetracyclo[4.4.0.1$^{2,5}$.1$^{7,10}$]-3-dodecene

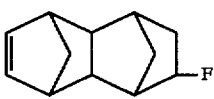

8-fluorotetracyclo[4.4.0.1$^{2,5}$.1$^{7,10}$]-3-dodecene and

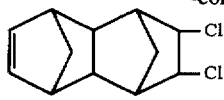

8,9-dichlorotetracyclo[4.4.0.1$^{2,5}$.1$^{7,10}$]-3-dodecene;
hexacyclo[6.6.1.1$^{3,6}$.1$^{10,13}$.0$^{2,7}$.0$^{9,14}$]-4-heptadecene derivatives such as

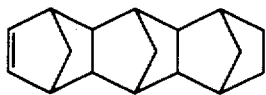

hexacyclo[6.6.1.1$^{3,6}$.1$^{10,13}$.0$^{2,7}$.0$^{9,14}$]-4-heptadecene

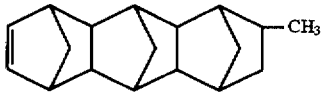

12-methylhexacyclo[6.6.1.1$^{3,6}$.1$^{10,13}$.0$^{2,7}$.0$^{9,14}$]-4-heptadecene

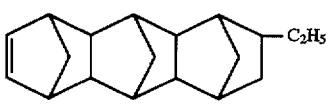

12-ethylhexacyclo[6.6.1.1$^{3,6}$.1$^{10,13}$.0$^{2,7}$.0$^{9,14}$]-4-heptadecene

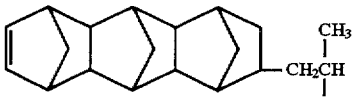

12-isobutylhexacyclo[6.6.1.1$^{3,6}$.1$^{10,13}$.0$^{2,7}$.0$^{9,14}$]-4-heptadecene and

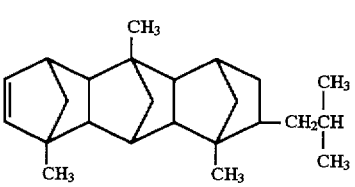

1,6,10-trimethyl-12-isobutylhexacyclo[6.6.1.1$^{3,6}$.1$^{10,13}$.0$^{2,7}$.0$^{9,14}$]-4-heptadecene;
octacyclo[8.8.0.1$^{2,9}$.1$^{4,7}$.1$^{11,18}$.1$^{13,16}$.0$^{3,8}$.0$^{12,17}$]-5-docosene derivatives such as

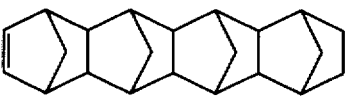

octacyclo[8.8.0.1$^{2,9}$.1$^{4,7}$.1$^{11,18}$.1$^{13,16}$.0$^{3,8}$.0$^{12,17}$]-5-docosene

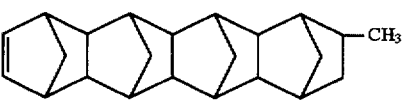

15-methyloctacyclo[8.8.0.1$^{2,9}$.1$^{4,7}$.1$^{11,18}$.1$^{13,16}$.0$^{3,8}$.0$^{12,17}$]-5-docosene and

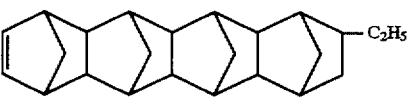

15-ethyloctacyclo[8.8.0.1$^{2,9}$.1$^{4,7}$.1$^{11,18}$.1$^{13,16}$.0$^{3,8}$.0$^{12,17}$]-5-docosene;
pentacyclo[6.6.1.1$^{3,6}$.0$^{2,7}$.0$^{9,14}$]-4-hexadecene derivatives such as

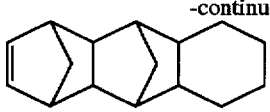

pentacyclo[6.6.1.1$^{3,6}$.0$^{2,7}$.0$^{9,14}$]-4-hexadecene

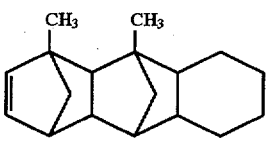

1,3-dimethylpentacyclo[6.6.1.1$^{3,6}$.0$^{2,7}$.0$^{9,14}$]-4-hexadecene

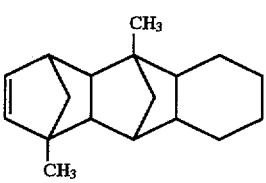

1,6-dimethylpentacyclo[6.6.1.1$^{3,6}$.0$^{2,7}$.0$^{9,14}$]-4-hexadecene and

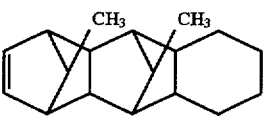

15,16-dimethylpentacyclo[6.6.1.1$^{3,6}$.0$^{2,7}$.0$^{9,14}$]-4-hexadecene;
heptacyclo[8.7.0.1$^{2,9}$.1$^{4,7}$.1$^{11,17}$.0$^{3,8}$.0$^{12,16}$]-5-eicosene derivatives
and heptacyclo[8.8.0.1$^{2,9}$.1$^{4,7}$.1$^{11,17}$.0$^{3,8}$.0$^{12,17}$]-5-heneicosene derivatives such as

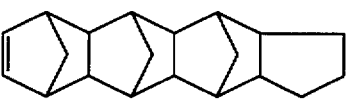

heptacyclo[8.7.0.1$^{2,9}$.1$^{4,7}$.1$^{11,17}$.0$^{3,8}$.0$^{12,16}$]-5-eicosene

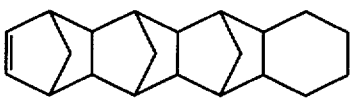

heptacyclo[8.8.0.1$^{2,9}$.1$^{4,7}$.1$^{11,18}$.0$^{3,8}$.0$^{12,17}$]-5-heneicosene and

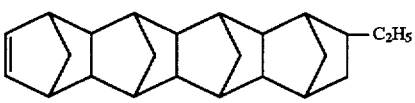

15-ethyloctacyclo[8.8.0.1$^{2,9}$.1$^{4,7}$.1$^{11,18}$.1$^{13,16}$.0$^{3,8}$.0$^{12,17}$]-5-docosene;
tricyclo[4.3.0.1$^{2,5}$]-3-decene derivatives such as

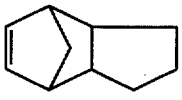

tricyclo[4.3.0.1$^{2,5}$]-3-decene

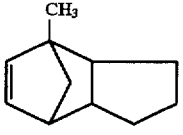

2-methyltricyclo[4.3.0.1$^{2,5}$]-3-decene and

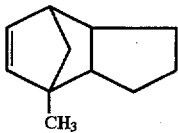

5-methyltricyclo[4.3.0.1$^{2,5}$]-3-decene;
tricyclo[4.4.0.1$^{2,5}$]-3-undecene derivatives such as

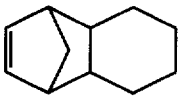

tricyclo[4.4.0.1$^{2,5}$]-3-undecene and

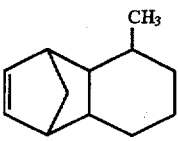

10-methyltricyclo[4.4.0.1$^{2,5}$]-3-undecene;
pentacyclo[6.5.1.1$^{3,6}$.0$^{2,7}$.0$^{9,13}$]-4-pentadecene derivatives such as

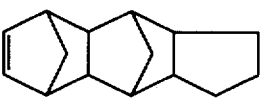

pentacyclo[6.5.1.1$^{3,6}$.0$^{2,7}$.0$^{9,13}$]-4-pentadecene

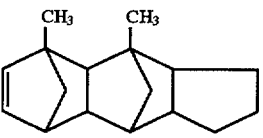

1,3-dimethylpentadecene[6.5.1.1$^{3,6}$.0$^{2,7}$.0$^{9,13}$]-4-pentadecene

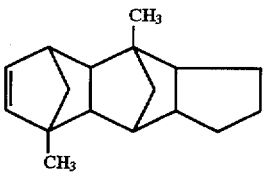

1,6-dimethylpentadecene[6.5.1.1$^{3,6}$.0$^{2,7}$.0$^{9,13}$]-4-pentadecene and

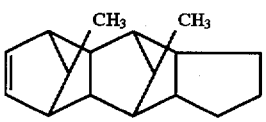

14,15-dimethylpentacyclo[6.5.1.1$^{3,6}$.0$^{2,7}$.0$^{9,13}$]-4-pentadecene;
diene compounds such as

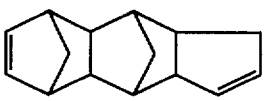

pentacyclo[6.5.1.1$^{3,6}$.0$^{2,7}$.0$^{9,13}$]-4,10-pentadecadiene;
pentacyclo[7.4.0.1$^{2,5}$.1$^{9,12}$.0$^{8,13}$]-3-pentadecene derivatives such as

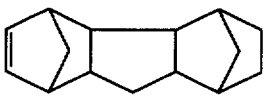

pentacyclo[7.4.0.1$^{2,5}$.1$^{9,12}$.0$^{8,13}$]-3-pentadecene and

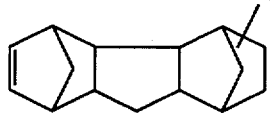

methyl-substituted pentacyclo[6.5.1.1$^{3,6}$.0$^{2,7}$.0$^{9,13}$]-3-pentadecene;
heptacyclo[8.7.0.1$^{3,6}$.1$^{10,17}$.1$^{12,15}$.0$^{2,7}$.0$^{11,16}$]-4-eicosene derivatives such as

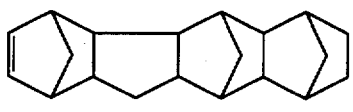

heptacyclo[8.7.0.1$^{3,6}$.1$^{10,17}$.1$^{12,15}$.0$^{2,7}$.0$^{11,16}$]-4-eicosene and

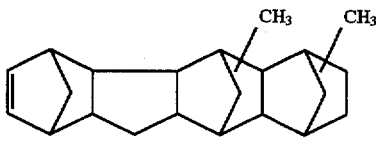

dimethyl-substituted heptacyclo[8.7.0.1$^{3,6}$.1$^{10,17}$.1$^{12,15}$.0$^{2,7}$.0$^{11,16}$]-4-eicosene;
nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivatives such as

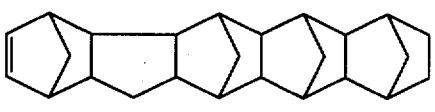

nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene and

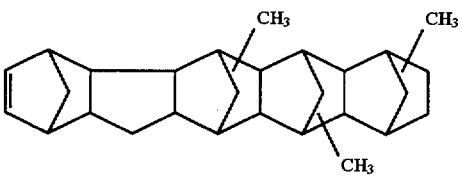

trimethyl-substituted nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene;
pentacyclo[8.4.0.1$^{2,5}$.1$^{9,12}$.0$^{8,13}$]-3-hexadecene derivatives such as

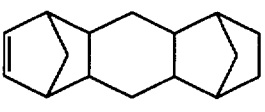

pentacyclo[8.4.0.1$^{2,5}$.1$^{9,12}$.0$^{8,13}$]-3-hexadecene

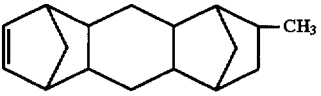

11-methyl-pentacyclo[8.4.0.1$^{2,5}$.1$^{9,12}$.0$^{8,13}$]-3-hexadecene

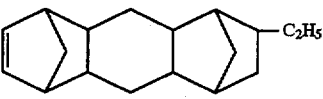

11-ethyl-pentacyclo[8.4.0.1$^{2,5}$.1$^{9,12}$.0$^{8,13}$]-3-hexadecene and

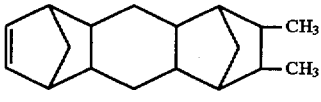

10,11-dimethyl-pentacyclo[8.4.0.1$^{2,5}$.1$^{9,12}$.0$^{8,13}$]-3-hexadecene;
heptacyclo[8.8.0.1$^{4,7}$.1$^{11,18}$.1$^{13,16}$.0$^{3,8}$.0$^{12,17}$]-5-heneicosene derivatives such as

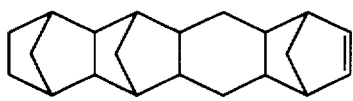

heptacyclo[8.8.0.1^{4,7}.1^{11,18}.1^{13,16}.0^{3,8}.0^{12,17}]-5-heneicosene

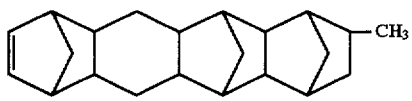

15-methyl-heptacyclo[8.8.0.1^{4,7}.1^{11,18}.1^{13,16}.0^{3,8}.0^{12,17}]-5-heneicosene and

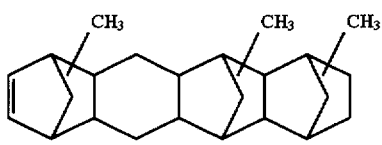

trimethyl-substituted heptacyclo[8.8.0.1^{4,7}.1^{11,18}.1^{13,16}.0^{3,8}.0^{12,17}] heneicosene;
nonacyclo[10.10.1.1^{5,8}.1^{14,21}.1^{16,19}.0^{2,11}.0^{4,9}.0^{13,22}.0^{15,20}]-6-hexacosene derivatives such as

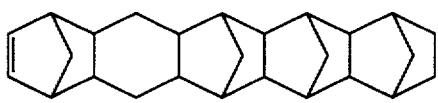

nonacyclo[10.10.1.1^{5,8}.1^{14,21}.1^{16,19}.0^{2,11}.0^{4,9}.0^{13,22}.0^{15,20}]-6-hexacosene;

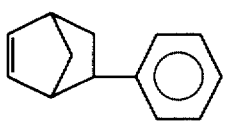

5-phenyl-bicyclo[2.2.1]hepto-2-ene;

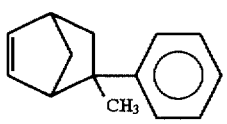

5-methyl-5-phenyl-bicyclo[2.2.1]hepto-2-ene;

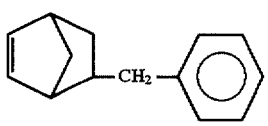

5-benzyl-bicyclo[2.2.1]hepto-2-ene;

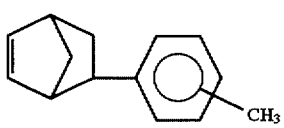

5-tolyl-bicyclo[2.2.1]hepto-2-ene;

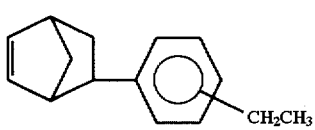

5-(ethylphenyl)-bicyclo[2.2.1]hepto-2-ene;

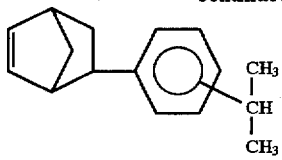

5-(isopropylphenyl)-bicyclo[2.2.1]hepto-2-ene;

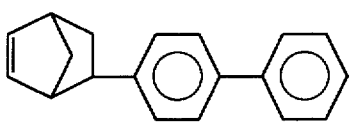

5-(biphenyl)-bicyclo[2.2.1]hepto-2-ene;

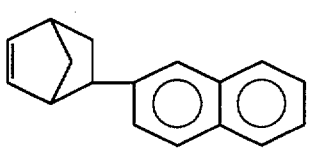

5-(β-naphthyl)-bicyclo[2.2.1]hepto-2-ene;

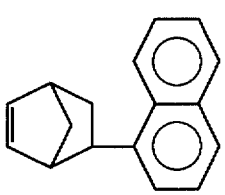

5-(α-naphthyl)-bicyclo[2.2.1]hepto-2-ene;

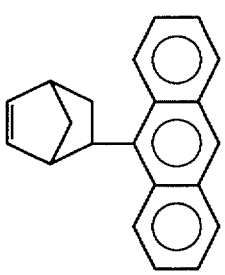

5-(anthracenyl)-bicyclo[2.2.1]hepto-2-ene;

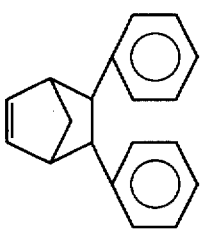

5,6-diphenyl-bicyclo[2.2.1]hepto-2-ene;

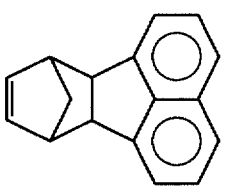

cyclopentadiene-acenaphthylene addition product;

-continued

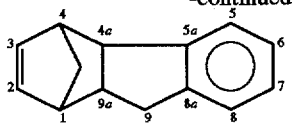

1,4-methano-1,4,4a,9a-tetrahydrofluorene;

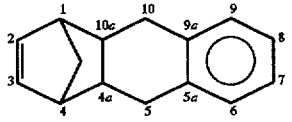

1,4-methano-1,4,4a,5,10,10a-hexahydroanthracene;

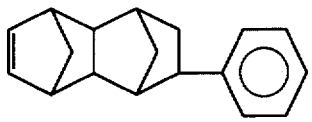

8-phenyl-tetracyclo[4.4.0.1$^{2,5}$.1$^{7,10}$]-3-dodecene;

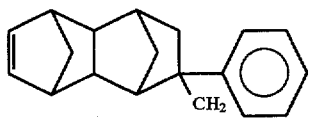

8-methyl-8-phenyl-tetracyclo[4.4.0.1$^{2,5}$.1$^{7,10}$]-3-dodecene;

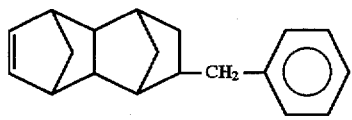

8-benzyl-tetracyclo[4.4.0.1$^{2,5}$.1$^{7,10}$]-3-dodecene;

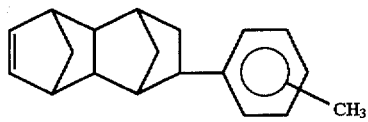

8-tolyl-tetracyclo[4.4.0.1$^{2,5}$.1$^{7,10}$]-3-dodecene;

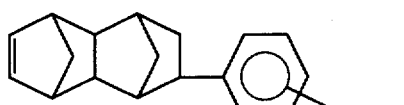

8-(ethylphenyl)-tetracyclo[4.4.0.1$^{2,5}$.1$^{7,10}$]-3-dodecene;

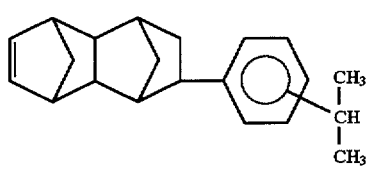

8-(isopropylphenyl)-tetracyclo[4.4.0.1$^{2,5}$.1$^{7,10}$]-3-dodecene;

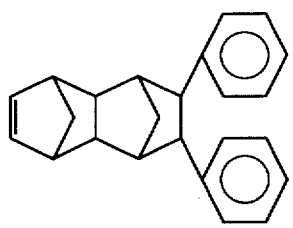

8,9-diphenyl-tetracyclo[4.4.0.1$^{2,5}$.1$^{7,10}$]-3-dodecene;

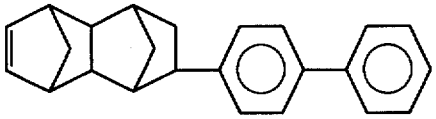

8-(biphenyl)-tetracyclo[4.4.0.1$^{2,5}$.1$^{7,10}$]-3-dodecene;

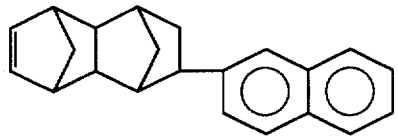

8-(β-naphthyl)-tetracyclo[4.4.0.1$^{2,5}$.1$^{7,10}$]-3-dodecene;

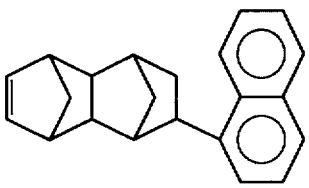

8-(α-naphthyl)-tetracyclo[4.4.0.1$^{2,5}$.1$^{7,10}$]-3-dodecene;

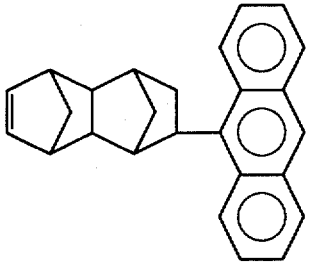

8-(anthracenyl)-tetracyclo[4.4.0.1$^{2,5}$.1$^{7,10}$]-3-dodecene;

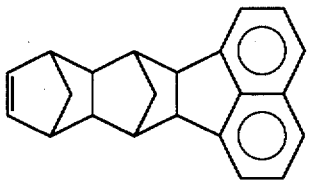

compound resulting from further addition of cyclopentadiene to cyclopentadiene-acenaphthylene addition product;

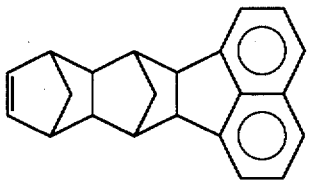

11,12-benzo-pentacyclo[6.5.1.1$^{3,6}$.0$^{2,7}$.0$^{9,13}$]-4-pentadecene;

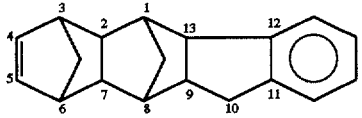

11,12-benzo-pentacyclo[6.6.1.1$^{3,6}$.0$^{2,7}$.0$^{9,14}$]-4-hexadecene;

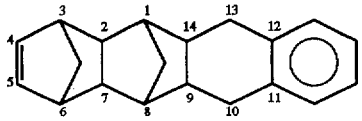

11-phenyl-hexacyclo[6.6.1.1$^{3,6}$.1$^{10,13}$.0$^{2,7}$.0$^{9,14}$]-4-heptadecene;

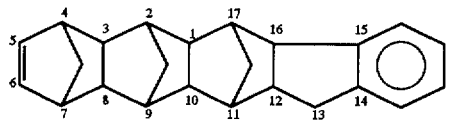

14,15-benzo-heptacyclo[8.7.0.1^{2,9}.1^{4,7}.1^{11,17}.0^{3,8}.0^{12,16}]-5-eicosene.

Additional examples of cyclic olefins represented by the above general formulas [I] and [II] are octahydronaphthalenes such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2-n-butyl-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, and pentacyclopentadecadiene (hereunder, "PCDE") and dicyclopentadiene (hereunder, "DCP").

A cyclic olefin represented by general formula [I] or [II] may be obtained by condensing a cyclopentadiene with a corresponding olefin or cyclic olefin by the Diels-Alder reaction.

These cyclic olefins may be used alone or in any combination of 2 or more.

The copolymerization ratio of the α-olefin and cyclic olefin in the α-olefin/cyclic olefin random copolymer is not particularly restricted, but it is normally in the range of 40–80 mol % of the α-olefin component and 20–60 mol % of the cyclic olefin component.

The α-olefin/cyclic olefin random copolymer is, generally, an amorphous polymer obtained by reaction in a solvent using a catalyst comprising a vanadium compound and organic aluminum compound which is soluble in the reaction solvent.

It is believed that the cyclic olefins represented by general formulas [I] and [II] in the α-olefin/cyclic olefin random copolymer form structures represented respectively by the following general formulas [I-a] and [II-a].

In this general formula [I-a], n, m, q, $R^1$–$R^{18}$, $R^a$ and $R^b$ have the same meanings as n, m, q, $R^1$–$R^{18}$, $R^a$ and $R^b$ in the aforementioned general formula [I].

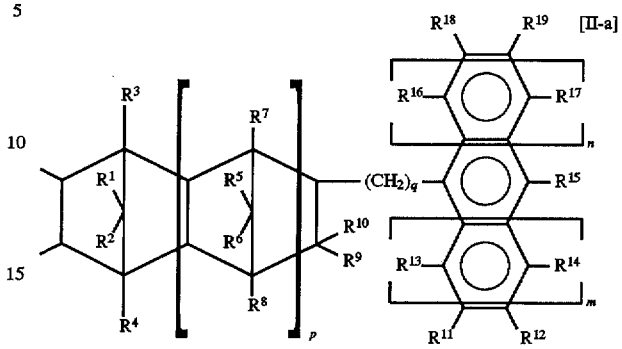

In this general formula [II-a], p, q, m, n and $R^1$–$R^{19}$ have the same meanings as p, q, m, n and $R^1$–$R^{19}$ in the aforementioned general formula [II].

Another useful and suitable cyclic olefin polymer according to the present invention is an open-ring polymer or open-ring copolymer of at least one type of cyclic olefin represented by one of the following general formulas [III] or [IV], or a hydrogenated product thereof (hereunder referred to as "cyclic olefin open-ring polymer or open-ring copolymer or hydrogenated product thereof").

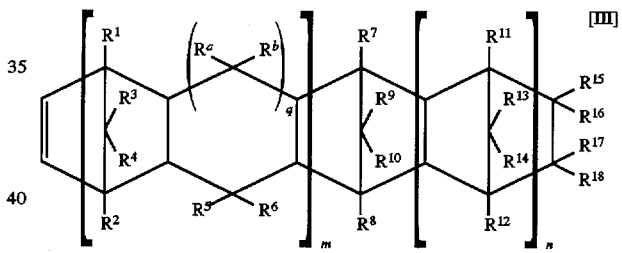

In this general formula [III], n is 0 or 1, m is 0 or a positive integer, q is 0 or 1, and $R^1$–$R^{18}$, $R^a$ and $R^b$ each independently represent an atom or group selected from the group consisting of hydrogen atoms, chlorine atoms, bromine atoms and hydrocarbons, wherein $R^{15}$–$R^{18}$ may be mutually attached to form a monocycle or polycycle which may contain double bonds, $R^{15}$ and $R^{16}$ or $R^{17}$ and $R^{18}$ may form an alkylidene group, or $R^{16}$ and $R^{17}$ may each independently be groups represented by the following formulas

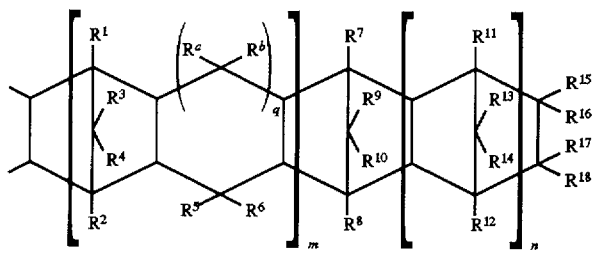

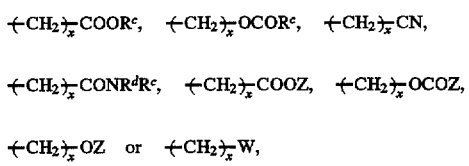

where $R^c$, $R^d$ and $R^e$ represent hydrocarbons of 1–20 carbon atoms, Z represents a hydrocarbon or a chlorine- or bromine-substituted hydrocarbon, W represents $SiR^g_p D_{3-p}$ (where $R^g$ represents a hydrocarbon of 1–10 carbon atoms, D represents a chlorine atom, bromine atom or $-OCOR^h$ ($R^h$ is a hydrocarbon of 1–10 carbon atoms) and p is an integer of 0–3), and x is an integer of 0–10, or $R^{16}$ and $R^{17}$ may form a group represented by the following formula

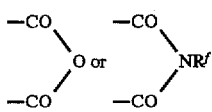

where $R^f$ represents a hydrocarbon of 1–20 carbon atoms.

[IV]

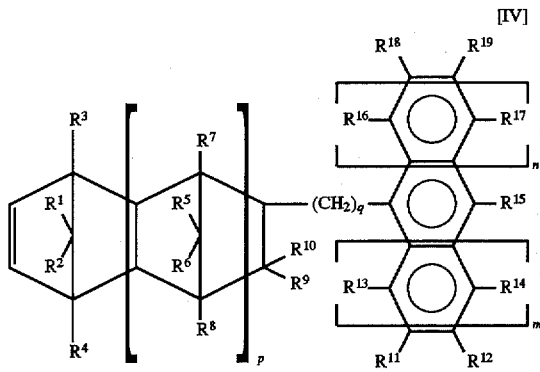

In this general formula [IV], p and q are each integers of 0, 1 or more, m and n are each 0, 1 or 2 and $R^1$–$R^{19}$ each independently represent an atom or group selected from the group consisting of hydrogen atoms, chlorine atoms, bromine atoms, aliphatic hydrocarbons, alicyclic hydrocarbons, aromatic hydrocarbons and alkoxy groups, wherein the carbon atom to which $R^9$ is attached and the carbon atom to which $R^{13}$ is attached, or the carbon atom to which $R^{10}$ is attached and the carbon atom to which $R^{11}$ is attached may be attached either directly or via an alkylene group of 1–3 carbon atoms, and when n=m=0, $R^{15}$ and $R^{12}$ or $R^{15}$ and $R^{19}$ may be mutually attached to form a monocyclic or polycyclic aromatic ring.

As cyclic olefins represented by the above general formulas [III] and [IV] to be used as components of the cyclic olefin open-ring polymer or open-ring copolymer or hydrogenated product thereof, there may be mentioned, in addition to the cyclic olefins which may be components of the α-olefin/cyclic olefin random copolymer mentioned earlier, also 5-methoxycarbonylbicyclo[2.2.1]hepto-2-ene, 5-ethoxycarbonylbicyclo[2.2.1]hepto-2-ene, 5-propoxycarbonylbicyclo[2.2.1]hepto-2-ene, 5-isopropoxycarbonylbicyclo[2.2.1]hepto-2-ene, 5-butoxycarbonylbicyclo[2.2.1]hepto-2-ene, 5-(2-methylpropoxy)carbonylbicyclo[2.2.1]hepto-2-ene, 5-(1,2-dimethylethoxy)carbonylbicyclo[2.2.1]hepto-2-ene, 5-cyclohexyloxycarbonylbicyclo[2.2.1]hepto-2-ene, 5-(4'-t-butylcyclohexyloxy)carbonylbicyclo[2.2.1]hepto-2-ene, 5-phenoxycarbonylbicyclo[2.2.1]hepto-2-ene, 5-methyl-5-methoxycarbonylbicyclo[2.2.1]hepto-2-ene, 5-methyl-5-ethoxycarbonylbicyclo[2.2.1]hepto-2-ene, 5-methyl-5-propoxycarbonylbicyclo[2.2.1]hepto-2-ene, 5-methyl-5-isopropoxycarbonylbicyclo[2.2.1]hepto-2-ene, 5-methyl-5-butoxycarbonylbicyclo[2.2.1]hepto-2-ene, 5-methyl-5-(2-methylpropoxy)carbonylbicyclo[2.2.1]hepto-2-ene, 5-methyl-5-(1,2-dimethylethoxy)carbonylbicyclo[2.2.1]hepto-2-ene, 5-methyl-5-cyclohexyloxycarbonylbicyclo[2.2.1]hepto-2-ene, 5-methyl- 5-(4'-t-butylcyclohexyloxy)carbonylbicyclo [2.2.1]hepto-2-ene, 5-methyl-5-phenoxycarbonylbicyclo[2.2.1]hepto-2-ene, 5-cyanobicyclo[2.2.1]hepto-2-ene, 5-methyl-5-cyanobicyclo[2.2.1]hepto-2-ene, 8-methoxycarbonyltetracyclo [4.4.0$^{2,5}$.1$^{7,10}$]dodeca-3-ene, 8-ethoxycarbonyltetracyclo [4.4.0$^{2,5}$.1$^{7,10}$]dodeca-3-ene, 8-propoxycarbonyltetracyclo [4.4.0$^{2,5}$.1$^{7,10}$]dodeca-3-ene, 8-isopropoxycarbonyltetracyclo [4.4.0$^{2,5}$.1$^{7,10}$]dodeca-3-ene, 8-butoxycarbonyltetracyclo [4.4.0$^{2,5}$.1$^{7,10}$]dodeca-3-ene, 8-(2-methylpropoxy)carbonyltetracyclo[4.4.0$^{2,5}$.1$^{7,10}$]dodeca-3-ene, 8-(1-methylpropoxy)carbonyltetracyclo [4.4.0$^{2,5}$.1$^{7,10}$]dodeca-3-ene, 8-(2,2-dimethylethoxy)carbonyltetracyclo [4.4.0$^{2,5}$.1$^{7,10}$]dodeca-3-ene, 8-cyclohexyloxycarbonyltetracyclo [4.4.0$^{2,5}$.1$^{7,10}$]dodeca-3-ene, 8-(4'-t-butylcyclohexyloxy)carbonyltetracyclo [4.4.0$^{2,5}$.1$^{7,10}$]dodeca-3-ene, 8-phenoxycarbonyltetracyclo [4.4.0$^{2,5}$.1$^{7,10}$]dodeca-3-ene, 8-methyl-8-methoxycarbonyltetracyclo[4.4.0$^{2,5}$.1$^{7,10}$]dodeca-3-ene, 8-methyl-8-ethoxycarbonyltetracyclo[4.4.0$^{2,5}$.1$^{7,10}$]dodeca-3-ene, 8-methyl-8-isopropoxycarbonyltetracyclo [4.4.0$^{2,5}$.1$^{7,10}$]dodeca-3-ene, 8-methyl-8-propoxycarbonyltetracyclo[4.4.0$^{2,5}$1$^{7,10}$]dodeca-3-ene, 8-methyl-8-butoxycarbonyltetracyclo[4.4.0$^{2,5}$.1$^{7,10}$]dodeca-3-ene, 8-methyl-8-(2-methylpropoxy)carbonyltetracyclo [4.4.0$^{2,5}$.1$^{7,10}$]dodeca-3-ene, 8-methyl-8-(1-methylpropoxy)carbonyltetracyclo [4.4.0$^{2,5}$.1$^{7,10}$]dodeca-3-ene, 8-methyl-8-(2,2-dimethylethoxy)carbonyltetracyclo [4.4.0$^{2,5}$1$^{7,10}$]dodeca-3-ene, 8-methyl-8-cyclohexyloxycarbonyltetracyclo [4.4.0$^{2,5}$.1$^{7,10}$]dodeca-3-ene, 8-methyl-8-(4'-t-butylcyclohexyloxy)carbonyltetracyclo [4.4.0$^{2,5}$.1$^{7,10}$]dodeca-3-ene, 8-methyl-8-phenoxycarbonyltetracyclo [4.4.0$^{2,5}$.1$^{7,10}$]dodeca-3-ene, 8-cyanotetracyclo[4.4.0$^{2,5}$.1$^{7,10}$]dodeca-3-ene and 8-methyl-8-cyanotetracyclo[4.4.0$^{2,5}$.1$^{7,10}$]dodeca-3-ene. These cyclic olefins may be used alone or in combinations of 2 or more.

The cyclic olefin open-ring polymer or open-ring copolymer or hydrogenated product thereof may be obtained by polymerization of one of the above-mentioned cyclic olefins in the presence of a catalyst comprising a halide of a metal such as ruthenium, rhodium, palladium, osmium, indium, platinum or tungsten, a nitrate of one of these metals or an acetylacetonate of one of these metals, and a reducing agent, and a catalyst comprising a halide of a metal such as titanium, palladium, zirconium or molybdenum or an acetylacetonate of one of these metals, and an organic aluminum compound.

It is believed that the cyclic olefins represented by general formulas [III] and [IV] in the cyclic olefin open-ring polymer or open-ring copolymer form repeating units represented respectively by the following general formulas [III-a] and [IV-a].

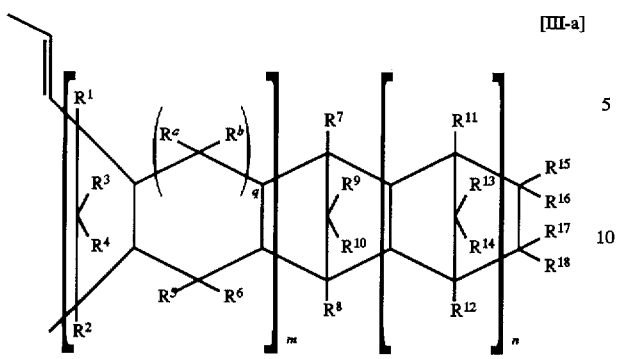

[III-a]

In this general formula [III-a], n, m, q, $R^1$–$R^{18}$, $R^a$ and $R^b$ have the same respective meaning as n, m, q, $R^1$–$R^{18}$, $R^a$ and $R^b$ in the aforementioned general formula [III].

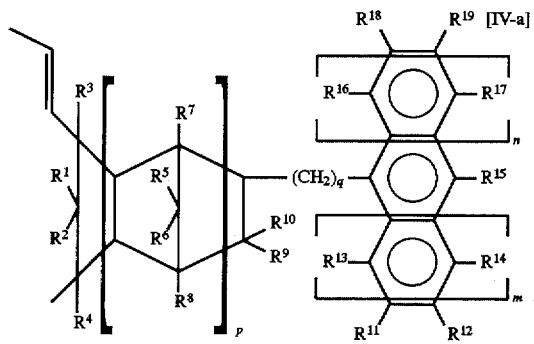

[IV-a]

In this general formula [IV-a], p, q, m, n and $R^1$–$R^{19}$ have the same respective meaning as p, q, m, n and $R^1$–$R^{19}$ in the aforementioned general formula [IV].

A hydrogenated product of the cyclic olefin open-ring polymer or open-ring copolymer may be obtained by reduction of a cyclic olefin open-ring polymer or open-ring copolymer of one of the above-mentioned general formulas [III-a] or [IV-a] with hydrogen in the presence of a hydrogen addition catalyst.

It is believed that the hydrogenated product of the cyclic olefin open-ring polymer or open-ring copolymer form repeating units represented respectively by the following general formulas [III-b] and [IV-b].

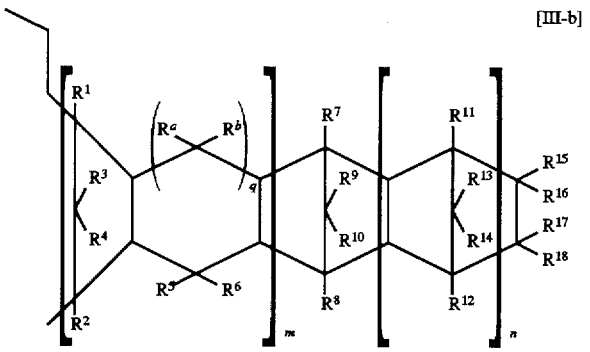

[III-b]

In this general formula [III-b], n, m, q, $R^1$–$R^{18}$, $R^a$ and $R^b$ have the same respective meaning as n, m, q, $R^1$–$R^{18}$, $R^a$ and $R^b$ in the aforementioned general formula [III].

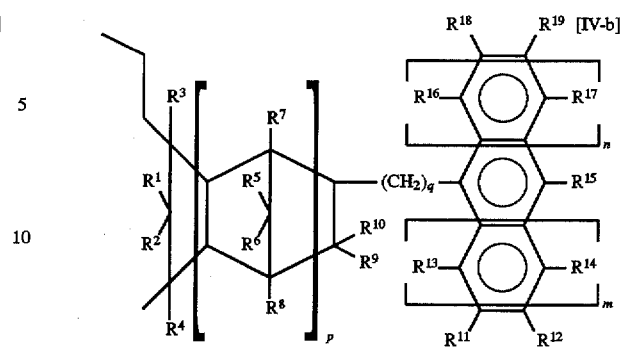

[IV-b]

In this general formula [IV-b], p, q, m, n and $R^1$–$R^{19}$ have the same respective meaning as p, q, m, n and $R^1$–$R^{19}$ in the aforementioned general formula [IV].

The α-olefin/cyclic olefin random copolymer and the cyclic olefin open-ring polymer or copolymer or hydrogenated product of the cyclic olefin open-ring polymer or copolymer described above usually have a limiting viscosity [η], as measured in 135° C. decalin, of 0.01–20 dl/g, preferably 0.05–10 dl/g and more preferably 0.08–8 dl/g.

The content of the polymer (B) in the polyester composition and polyester monofilaments of the present invention is in the range of 0.2–40 wt %. If the content of the polymer (B) is less than 0.2 wt %, the resulting polyester composition and polyester monofilaments have insufficient resistance to hydrolysis. Conversely, if the content of the polymer (B) exceeds 40 wt %, the resulting polyester composition and polyester monofilaments have reduced tensile strength. The content of the polymer (B) in the polyester monofilaments of the present invention is even more preferably in the range of 1–20 wt %, since this tends to give a polyester composition and polyester monofilaments with even better resistance to hydrolysis.

The aforementioned polyester may, if necessary, be a blend with a resin such as polyesteramide, epoxy resin, silicone resin or polyurethane resin.

The concentration of terminal carboxyl groups in the polyester of the polyester composition and polyester monofilaments of the present invention is not more than 10 equivalents/$10^6$ g of polyester. This concentration of terminal carboxyl groups has been determined by the method proposed by Pohl in "ANALYTICAL CHEMISTRY", Vol.26, page 1614.

If the concentration of terminal carboxyl groups exceeds 10 equivalents/$10^6$ g, there arises a disadvantage in that the polyester composition and polyester monofilaments have insufficient resistance to hydrolysis.

A polyester composition and polyester monofilaments with a concentration of terminal carboxyl groups of not more than 10 equivalents/$10^6$ g may be obtained even using a polyester with a concentration of terminal carboxyl groups exceeding 10 equivalents/$10^6$ g that has been subjected to solid-phase polymerization to reduce the terminal carboxyl group concentration to less than 10 equivalents/$10^6$ g, and causing this polyester to react in the molten state with a suitable amount of a mono- or di-epoxy compound, mono- or bis-oxazoline compound or carbodiimide compound. However, since the polyester composition and polyester monofilaments of the present invention contain 0.005 wt % or more of unreacted carbodiimide compound (C), there is an advantage in using a carbodiimide compound.

The polyester composition and polyester monofilaments of the present invention must contain no less than 0.005 wt % and no more than 1.5 wt % of a carbodiimide compound (C) in the unreacted state. Also, the content of the unreacted carbodiimide compound (C) is more preferably between 0.01 wt % and 1.5 wt %. When the content of the unreacted carbodiimide compound (C) is less than 0.005 wt %, there is little effect of greater resistance to hydrolysis, and when it exceeds 1.5 wt % the properties of the resulting polyester composition and polyester monofilaments tend to be inferior, while it tends to bleed out from the polymer during production of the polyester composition and polyester monofilaments.

The content of unreacted carbodiimide compound (C) in the polyester composition and polyester monofilaments of the present invention is determined according to the following method.

(1) About 200 mg of sample is weighed out into a 100 ml measuring flask.

(2) 2 ml of hexafluoroisopropanol/chloroform (volume ratio: 1/1) is added to dissolve the sample.

(3) Upon dissolution of the sample, 8 ml of chloroform is added.

(4) Acetonitrile/chloroform (volume ratio: 9/1) is gradually added to 100 ml while precipitating the polymer.

(5) The sample solution is filtered with a 0.45 µm mesh disk filter, and quantitatively analyzed by HPLC (high-performance liquid chromatography). The HPLC analysis conditions are as follows.

Column: Inertsil ODS-2 4.6 mm×250 mm
Mobile phase: Acetonitrile/water (volume ratio: 94/6)
Flow rate: 1.5 ml/min
Sample volume: 20 µl
Detector: UV (280 nm)

Between 0.005 wt % and 1.5 wt % of unreacted carbodiimide compound may be left in the polyester by adding one of the aforementioned carbodiimide compounds to the polyester in such an amount that upon reaction the concentration of carbodiimide compound in an unreacted state in the reacted polyester is between 0.005 wt % and 1.5 wt %, based on the terminal carboxyl group concentration of the polyester starting material and the reaction conditions. The carbodiimide compound (C) may be any compound with 1, 2 or more carbodiimide groups per molecule, and examples thereof include N,N'-di-o-tolylcarbodiimide, N,N'-diphenylcarbodiimide, N,N'-dioctyldecylcarbodiimide, N,N-di-2,6-dimethylphenylcarbodiimide, N-tolyl-N'-cyclohexylcarbodiimide, N,N'-di-2,6-diisopropylphenylcarbodiimide, N,N'-di-2,6-di-tert-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-dicyclohexylcarbodiimide, N,N'-di-p-tolylcarbodiimide, p-phenylene-bis-di-o-tolylcarbodiimide, p-phenylene-bis-dicyclohexylcarbodiimide, hexamethylene-bis-dicyclohexylcarbodiimide, ethylene-bis-diphenylcarbodiimide, and aromatic polycarbodiimides represented by the following general formula.

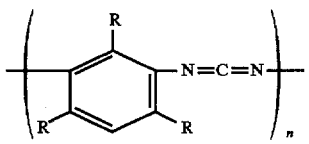

where R represents hydrogen or an alkyl group of 1–4 carbon atoms, and n is an integer of 2–20.

Any one, 2 or more of these carbodiimide compounds may be selected as desired for addition to the polyester, but from the point of view of stability after addition to the polyester, it is generally advantageous to use compounds with aromatic skeletons, of which N,N'-di-2,6-diisopropylphenylcarbodiimide, N,N'-di-2,6-di-tert-butylphenylcarbodiimide, N,N'-di-2,6-dimethylphenylcarbodiimide and N,N'-di-o-tolylcarbodiimide are preferred, and N,N'-di-2,6-diisopropylphenylcarbodiimide (hereunder, "TIC") is particularly preferred.

The mixing of the polyester (A), polymer (B) and carbodiimide compound (C) according to the present invention is usually carried out by a method in which the polyester (A), polymer (B) and carbodiimide compound (C) are mixed and then reacted in reactor while stirring, a method in which the carbodiimide compound (C) is added to chips of the polyester (A) prior to melting and mixing, after which the polymer (B) is added for further melting and mixing, or a method in which the polymer (B) and the carbodiimide compound (C) are melted and mixed first, and then the polyester (A) is melted and mixed therewith.

It is particularly preferable to use a method in which the polymer (B) and the carbodiimide compound (C) are melted and mixed either prior to or while melting the polyester (A), after which the polyester (A) is melted and mixed therewith.

The reason for this is not clear, but it is conjectured that when the polymer (B) and the carbodiimide compound (C) are melted and mixed first, the carbodiimide compound (C) is included and retained in the polymer (B), and since the polyester (A) is melted and mixed therewith afterwards, this helps to prevent side reaction between the terminal hydroxyl groups of the polyester (A) and the carbodiimide compound (C) which occurs when the polyester (A) and carbodiimide compound (C) are mixed directly, thus allowing efficient blocking reaction on the terminal carboxyl groups.

This theory is supported by the fact that the content of the unreacted carbodiimide compound (C) in the polyester composition and polyester monofilaments of the present invention tends to be directly proportional to the content of the polymer (B) in the same polyester composition and polyester monofilaments. Thus it may be said that the excellent resistance to hydrolysis maintained in the polyester composition and polyester monofilaments of the present invention is an unexpected synergistic effect above and beyond the effect of simply combining the polyester (A), polymer (B) and carbodiimide compound (C).

A particularly preferred production process will now be explained in detail.

The preferred production process is one in which the necessary amount of the carbodiimide compound (C) is added to the polymer (B) and the mixture is heated to a melt in an extruder or mixer, stirred and then taken out and cooled, after which the pelletized master polymer is melted and mixed together with the polyester (A), and this final mixture is extruded into a polyester composition or polyester monofilaments. (This process is hereunder referred to as the "master polymer process".)

Alternatively, in cases where the softening point of the polymer (B) is lower than the melting point of the polyester (A), a process in which prescribed amounts of the polyester (A), polymer (B) and carbodiimide compound (C) are fed to an extruder and stirred while heating, melting and mixing them at a temperature above the melting point of the polyester (A), and then the mixture is extruded into a polyester composition or polyester monofilaments. (This process is hereunder referred to as the "extruder process"). In this case, when the polyester (A), polymer (B) and carbodiimide compound (C) are fed to the extruder and moved to a heat zone while being sheared with a screw, there occurs the phenomenon that the polymer (B) and the carbodiimide compound (C) are first melted and mixed in the extruder due to the heat of shearing and the heating, thus forming a composition in which the polymer (B) and the carbodiimide compound (C) are substantially melted and kneaded together beforehand. After, or during this process, the polyester (A) melts, and this polyester (A) is then melted and kneaded with the previously melted and kneaded polymer (B) and carbodiimide compound (C) composition. Because this process does not require special equipment such as a melting kneader or pelletizer, it is preferred for production of the polyester composition and polyester monofilaments of the present invention.

For the effect of the present invention to be manifested at the highest possible efficiency, the polyester preferably contains a phosphorus compound in an amount not exceeding 50 ppm in terms of phosphorus atoms and within the following range.

$$5\times10^{-3} \leq P \leq M+8\times10^{-3}$$

Here, P stands for the molar percent of phosphorus atoms with respect to the dibasic acid forming the polyester and M stands for the metal in the polyester resin, which is at least one metal atom selected from among the elements of families II, VII and VIII and periods 3 and 4 in the periodic table, with respect to the dibasic acid forming the polyester, providing that M=0 is allowed.

Needless to mention, the polyester composition and polyester monofilaments of the present invention may also contain, if desired, a fluorine-containing resin as an extra component.

A polyester composition according to the present invention obtained in this manner has more excellent resistance to hydrolysis than one obtained by the prior art, and it may be suitably used in mechanical parts of electric connectors, gears, bearings and the like and resin molds or monofilaments for various structural materials, all of which are used in high-temperature, high-humidity environments.

As mentioned earlier, polyester monofilaments of the present invention may be produced by a publicly known method in which a prescribed amount of a carbodiimide compound (C) is added to a polyester (A) and a polymer (B), and the mixture is extruded from a spinning nozzle via a polymer streamline switcher or filtration layers situated at one end of the extruder while being kneaded by the extruder and cooled, stretched and thermoset.

The polyester monofilaments of the present invention have a core of a polyester which does not contain a polymer (B), and they may be core/sheath composite monofilaments with a sheath of a polyester containing a polymer (B), or core/sheath composite monofilaments of which both the core and sheath are of a polyester which contains a polymer (B), with the contents and/or types of the polymer (B) in the core and sheath sections being different.

The monofilament of the present invention is a continuous fiber consisting of a single yarn, and it may be in any form, with a cross-sectional shape which is circular, triangular, rectangular, regular polygonal, etc. The diameter of the cross-section may be appropriately selected depending on the use, but the range of 0.05–3 mm is most popularly used. In addition, the strength required for the filament will differ depending on the use, but it is generally preferred to be at least 3.0 g/denier.

Polyester filaments of the present invention obtained in the manner described above have more excellent resistance to hydrolysis than those obtained by the prior art, and they may be used as structural fibers for various filters, various industrial grade fabrics such as paper machine fabrics and paper drier canvas and the like, and reinforcing materials.

A paper drier canvas according to the present invention is weaved using the above-mentioned polyester monofilaments of the present invention in at least a portion of the warp and/or weft forming the drier canvas. The manner of weaving the canvas may be appropriately selected depending on the use, and publicly known weaving methods may be employed, including plain weave, twill weave, double weave, triple weave, and the like.

The paper drier canvas according to the present invention has more excellent resistance to hydrolysis than one obtained by the prior art, and undergoes less deterioration during use than a paper drier canvas produced using polyester monofilaments of the prior art, thus allowing its extended usefulness.

Rubber molds such as power conveyer belts, tires and the like which employ polyester monofilaments of the present invention as reinforcing materials are useful because even when used extensively in a high temperature environment, degradation of the polyester monofilaments inside the rubber is prevented to allow their extended use.

The present invention is more fully explained below by way of the following examples.

The characteristic values of the polyester compositions and polyester monofilaments in the following examples were measured by the method described below, unless otherwise specified.

1. Preparation of test piece

An IS-35 injection molding machine manufactured by Toshiba Kikai, KK. was used to form a prescribed mold test piece under the following conditions.

(1) Cylinder temperature: 280° C.

(2) Mold temperature: 60° C.

(3) Injection pressure (primary/secondary): 1000/800 kg/cm$^2$ (4) Injection rate (primary): 30 mm/sec (5) Screw rotation rate: 150 rpm (6) Injection cycle (injection+dwelling pressure/cooling): 10 sec/30 sec 2. Tension test on polyester composition Performed according to the method of ASTM D638.

(1) Sample form: Type IV (2) Tension rate: 50 mm/min (3) Testing temperature: 23° C.

3. Tension test on polyester monofilaments

Performed according to the method of JIS L1013-1992

(1) Sample clamp spacing: 25 cm (2) Tension rate: 30 cm/min (3) Testing temperature: 20° C.

EXAMPLE 1

As the polyester (A) there were prepared dry polyethylene terephthalate chips with a limiting viscosity of 0.94 and a terminal carboxyl group concentration of 13 equivalents/10$^6$ g (hereunder, "PET chips").

As the polymer (B) there were prepared chips of a random copolymer of ethylene and the cyclic olefin, tetracyclo [4.4.0.1$^{2,5}$.1$^{7,10}$]-3-dodecene (ethylene content: 62 mol %, [η]: 0.47, Tg: 137° C., MFR: 15 g/10 min as measured according to ASTM D1238 at 260° C.) (hereunder, "PETCD chips").

As the carbodiimide compound there was prepared TIC heated to melting at 80° C. (hereunder, "liquid TIC").

There were measured out 95 parts by weight of the PET chips and 5 parts by weight of the PETCD chips while they were fed to a single screw extruder via the hopper and a polymer tube below the hopper of the single screw extruder. At the same time, liquid TIC was fed to the above-mentioned chip mixture in the polymer tube under the hopper in an amount of 1.38 parts by weight to 100 parts by weight of the chip mixture. The PET chips, PETCD chips and liquid TIC were kneaded for 3 minutes at about 285° C. in the single screw extruder to obtain a polymer melt which was extruded from the end of the extruder into a gut, and then cooled in a water bath at about 20° C. and cut with a strand cutter to obtain polyester composition pellets by the extruder process. The terminal carboxyl group concentration (hereunder, "terminal COOH concentration") of the resulting pellets, the terminal COOH concentration of the pellets after hydrolytic treatment for 6 hours in saturated water vapor at 160° C., and the change in terminal COOH concentration before and after hydrolysis were used to calculate the ester bond breakage (hereunder, "%BB") according to the following formula, and the results are listed in Table 1. Smaller values of %BB indicate superior resistance to hydrolysis.

$$\{(COOH^f - COOH^i)/((10^6/M) \times 2)\} \times 100$$

$COOH^i$ in this formula represents the terminal COOH concentration (eq/$10^6$ g polyester) prior to hydrolytic treatment, $COOH^f$ represents the terminal COOH concentration (eq/$10^6$ g polyester) after hydrolytic treatment, and M represents the molecular weight per repeating units of the polyester.

Table 1 also shows the results of a tension test performed using a test piece prepared in the manner described above, after drying the obtained polyester composition pellets for 8 hours at 160° C. under a pressure of not more than 1 mmHg.

COMPARATIVE EXAMPLES 1–3

Table 1 also lists the properties of polyester compositions obtained in the same manner as in Example 1, except without addition of PETCD chips and TIC (Comparative Example 1), without addition of PETCD chips (Comparative Example 2) and without addition of TIC (Comparative Example 3).

EXAMPLES 2–10

Table 1 also lists the properties of polyester compositions obtained in the same manner as in Example 1, except that the PETCD chips of Example 1 were replaced with a copolymer of ethylene and 5-phenyl-bicyclo[2.2.1]hepto-2-ene (MFR: 20 g/10 min as measured according to ASTM D1238 at 260° C.) (hereunder, "PHPhBH") (Example 2); a copolymer of ethylene, tetracyclo[4.4.0.1$^{2,5}$.1$^{7,10}$]-3-dodecene and butene-1 (MFR: 20 g/10 min as measured according to ASTM D1238 at 260° C.) (hereunder, "PETCDB") (Example 3); APEL (registered trademark) 6015 (product of Mitsui Sekiyu Kagaku, KK., ethylene/cyclic olefin copolymer, MFR: 10 g/10 min as measured according to ASTM D1238 at 260° C.) (Example 4); APEL (registered trademark) 6013 (product of Mitsui Sekiyu Kagaku, KK., ethylene/cyclic olefin copolymer, MFR: 15 g/10 min as measured according to ASTM D1238 at 5 260° C.) (Example 5); APEL (registered trademark) 6011 (product of Mitsui Sekiyu Kagaku, KK., ethylene/cyclic olefin copolymer, MFR: 25 g/10 min as measured according to ASTM D1238 at 260° C.) (Example 6); APEL (registered trademark) 6509 (product of Mitsui Sekiyu Kagaku, KK., ethylene/cyclic olefin copolymer, MFR: 40 g/10 min as measured according to ASTM D1238 at 260° C.) (Example 7); APEL (registered trademark) 150R (product of Mitsui Sekiyu Kagaku, KK., ethylene/cyclic olefin copolymer, MFR: 2 g/10 min as measured according to ASTM D1238 at 260° C.) (Example 8); APEL (registered trademark) 130A (product of Mitsui Sekiyu Kagaku, KK., ethylene/cyclic olefin copolymer, MFR: 3 g/10 min as measured according to ASTM D1238 at 260° C.) (Example 9); and APEL (registered trademark) 210A (product of Mitsui Sekiyu Kagaku, KK., ethylene/cyclic olefin copolymer, MFR: 7 g/10 min as measured according to ASTM D1238 at 260° C.) (Example 10).

EXAMPLES 11–15

Table 1 also lists the properties of polyester compositions obtained in the same manner as in Example 1, except that the PETCD chips of Example 1 were replaced with high-density polyethylene with a melting point of 132° C. (hereunder, "HDPE") (Example 11); polypropylene with a melting point of 180° C. (hereunder, "PP") (Example 12); polystyrene with a Vicat softening point (JIS K7246) of 79° C. (hereunder, "PS") (Example 13); polymethylpentene with a melting point of 235° C. (hereunder, "PMPT") (Example 14); and the methacrylic resin Sumipex (registered trademark) MH with a Vicat softening point of 116° C. (product of Sumitomo Kagaku Kogyo, KK., hereunder "PMMA") (Example 15).

EXAMPLES 16 and 17

Table 1 also lists the properties of polyester compositions obtained in the same manner as in Example 1, except that the PETCD chips of Example 1 were replaced with the dicyclopentadiene open-ring polymer ZEONEX (registered trademark) 280 (product of Nihon Zeon, KK.) with an MI value of 15 g/10 min as measured at 280° C. according to JIS K6719 (Example 16) and the dicyclopentadiene open-ring polymer ZEONEX (registered trademark) 250 (product of Nihon Zeon, KK.) with an MI value of 5 g/10 min as measured at 280° C. according to JIS K6719 (Example 17).

EXAMPLES 18–20

Table 1 also lists the properties of polyester compositions obtained in the same manner as in Example 1, except that the PETCD chips of Example 1 were replaced with 5-methoxycarbonylbicyclo[2.2.1]hepto-2-ene open-ring polymer chips (hereunder, "PMTCHP") (Example 18); 8-methoxycarbonyltetracyclo[4.4.0$^{2,5}$.1$^{7,10}$]dodeca-3-ene open-ring polymer chips (hereunder, "PMTCDD") (Example 19); and 8-cyanotetracyclo[4.4.0$^{2,5}$.1$^{7,10}$]dodeca-3-ene open-ring polymer chips (hereunder "PCTCDD") (Example 20).

EXAMPLES 21 and 22

Table 1 also lists the properties of polyester compositions obtained in the same manner as in Example 1, except that the PETCD chips of Example 1 were replaced with a hydrogenated dicyclopentadiene open-ring polymer (hereunder, "PDCP") (Example 21) and a hydrogenated pentacyclo[7.4.0.1$^{9,12}$.1$^{9,12}$.0$^{8,13}$]-4-pentadecene open-ring polymer (hereunder, "PPCPE") (Example 22).

COMPARATIVE EXAMPLE 4

Table 1 also lists the properties of a polyester composition obtained in the same manner as in Example 1, except that the PETCD chips of Example 1 were replaced with ETFE.

TABLE 1

| No. | Polymer composition PET (A) (wt %) | Polymer (B) Type | Polymer (B) Amt. (wt %) | TIC added (wt %) | COOH conc. of resin comp. (eq/$10^6$ g) | Content of unreacted TIC in resin comp. (wt %) | Tensile strength of resin comp. (kg/cm$^2$) | COOH conc. of resin comp. after hydrolysis (eq/$10^6$ g) | % BB upon hydrolysis of resin comp. |
|---|---|---|---|---|---|---|---|---|---|
| Comp. Ex. 1 | 100 | — | — | — | 17 | — | 620 | 128 | 1.07 |
| Comp. Ex. 2 | 100 | — | — | 1.38 | 1 | 0.110 | 610 | 57 | 0.54 |
| Comp. Ex. 3 | 95 | PETCD | 5 | — | 16 | — | 600 | 120 | 1.00 |
| Example 1 | 95 | PETCD | 5 | 1.38 | 1 | 0.215 | 590 | 19 | 0.17 |
| Example 2 | 95 | PHPhEH | 5 | 1.38 | 1 | 0.203 | 570 | 20 | 0.18 |
| Example 3 | 95 | PETVDB | 5 | 1.38 | 0 | 0.210 | 580 | 19 | 0.18 |
| Example 4 | 95 | APEL 6015 | 5 | 1.38 | 1 | 0.221 | 590 | 17 | 0.15 |
| Example 5 | 95 | APEL 6013 | 5 | 1.38 | 0 | 0.215 | 580 | 18 | 0.17 |
| Example 6 | 95 | APEL 6011 | 5 | 1.38 | 0 | 0.216 | 580 | 18 | 0.17 |
| Example 7 | 95 | APEL 6509 | 5 | 1.38 | 0 | 0.213 | 580 | 18 | 0.17 |
| Example 8 | 95 | APEL 150R | 5 | 1.38 | 1 | 0.205 | 580 | 19 | 0.17 |
| Example 9 | 95 | APEL 130A | 5 | 1.33 | 0 | 0.209 | 580 | 19 | 0.18 |
| Example 10 | 95 | APEL 210A | 5 | 1.38 | 0 | 0.209 | 580 | 19 | 0.18 |
| Example 11 | 95 | HDPE | 5 | 1.38 | 1 | 0.200 | 580 | 23 | 0.21 |
| Example 12 | 95 | PP | 5 | 1.38 | 0 | 0.202 | 580 | 21 | 0.20 |
| Example 13 | 95 | PS | 5 | 1.38 | 1 | 0.203 | 580 | 22 | 0.20 |
| Example 14 | 95 | PMPT | 5 | 1.38 | 0 | 0.200 | 580 | 23 | 0.21 |
| Example 15 | 95 | PMMA | 5 | 1.38 | 1 | 0.203 | 580 | 25 | 0.25 |
| Example 16 | 95 | ZEONEX 280 | 5 | 1.38 | 0 | 0.220 | 580 | 18 | 0.17 |
| Example 17 | 95 | ZEONEX 250 | 5 | 1.38 | 1 | 0.216 | 580 | 19 | 0.17 |
| Example 18 | 95 | PMTCHP | 5 | 1638 | 0 | 0.215 | 580 | 18 | 0.17 |
| Example 19 | 95 | PMTCDD | 5 | 1.38 | 0 | 0.213 | 580 | 18 | 0.17 |
| Example 20 | 95 | PCTCDD | 5 | 1.38 | 0 | 0.206 | 580 | 19 | 0.18 |
| Example 21 | 45 | PDCP | 5 | 1.38 | 1 | 0.209 | 580 | 19 | 0.17 |
| Example 22 | 95 | PPCPE | 5 | 1.38 | 0 | 0.210 | 580 | 19 | 0.18 |
| Comp. Ex. 4 | 95 | ETFE | 5 | 1.38 | 0 | 0.115 | 580 | 53 | 0.51 |

EXAMPLES 23–27, COMPARATIVE EXAMPLES 5 and 6

Table 2 lists the properties of polyester compositions obtained in the same manner as in Example 1, except that the amounts of the PET chips and PETCD chips of Example 1 were changed as listed in Table 2. Table 2 also shows the results of Comparative Example 2 and Example 1.

EXAMPLES 28–32, COMPARATIVE EXAMPLES 7 and 8

Table 2 also lists the properties of polyester compositions obtained in the same manner as in Example 1, except that the amounts of the PET chips and APEL 6015 of Example 4 were changed as listed in Table 2. Table 2 also shows the results of Example 4.

TABLE 2

| No. | Polymer composition PET (A) (wt %) | Polymer (B) Type | Polymer (B) Amt. (wt %) | TIC added (wt %) | COOH conc. of resin comp. (eq/$10^6$ g) | Content of unreacted TIC in resin comp. (wt %) | Tensile strength of resin comp. (kg/cm$^2$) | COOH conc. of resin comp. after hydrolysis (eq/$10^6$ g) | % BB upon hydrolysis of resin comp. |
|---|---|---|---|---|---|---|---|---|---|
| Comp. Ex. 2 | 100 | — | — | 1.38 | 1 | 0.110 | 610 | 57 | 0.54 |
| Comp. Ex. 5 | 99.9 | PETCD | 0.1 | 1.38 | 1 | 0.128 | 610 | 50 | 0.47 |
| Example 23 | 99.8 | PETCD | 0.2 | 1.38 | 1 | 0.150 | 610 | 35 | 0.34 |
| Example 24 | 99.0 | PETCD | 1.0 | 1.38 | 0 | 0.175 | 610 | 31 | 0.30 |
| Example 1 | 95 | PETCD | 5 | 1.38 | 1 | 0.215 | 590 | 19 | 0.17 |
| Example 25 | 90 | PETCD | 10 | 1.38 | 1 | 0.230 | 560 | 15 | 0.13 |
| Example 26 | 80 | PETCD | 20 | 1.38 | 0 | 0.238 | 550 | 13 | 0.12 |
| Example 27 | 60 | PETCD | 40 | 1.38 | 0 | 0.245 | 520 | 11 | 0.11 |
| Comp. Ex. 6 | 59 | PETCD | 41 | 1.38 | 0 | 0.246 | 410 | 11 | 0.11 |
| Comp. Ex. 7 | 99.9 | APEL 6015 | 0.1 | 1.38 | 0 | 0.127 | 610 | 52 | 0.50 |
| Example 28 | 99.8 | APEL 6015 | 0.2 | 1.38 | 1 | 0.151 | 610 | 34 | 0.32 |
| Example 29 | 99.0 | APEL 6015 | 1.0 | 1.38 | 0 | 0.174 | 610 | 30 | 0.29 |
| Example 4 | 95 | APEL 6015 | 5 | 1.38 | 1 | 0.221 | 590 | 17 | 0.15 |
| Example 30 | 90 | APEL 6015 | 10 | 1.38 | 1 | 0.231 | 560 | 15 | 0.13 |
| Example 31 | 80 | APEL 6015 | 20 | 1.38 | 1 | 0.239 | 550 | 14 | 0.12 |
| Example 32 | 60 | APEL 6015 | 40 | 1.38 | 0 | 0.245 | 520 | 12 | 0.12 |
| Comp. Ex. 8 | 59 | APEL 6015 | 41 | 1.38 | 1 | 0.245 | 420 | 12 | 0.11 |

EXAMPLES 33–37, COMPARATIVE EXAMPLES 9 and 10

Table 3 lists the properties of polyester compositions obtained in the same manner as in Example 11, except that the amounts of the PET chips and HDPE of Example 11 were changed as listed in Table 3. Table 3 also shows the results of Comparative Example 2 and Example 11.

EXAMPLES 38–42, COMPARATIVE EXAMPLES 11 and 12

Table 3 also lists the properties of polyester compositions obtained in the same manner as in Example 12, except that the amounts of the PET chips and PP of Example 12 were changed as listed in Table 3. Table 3 also shows the results of Example 12.

EXAMPLES 43–47, COMPARATIVE EXAMPLES 13 and 14

Table 3 also lists the properties of polyester compositions obtained in the same manner as in Example 13, except that the amounts of the PET chips and PS of Example 13 were changed as listed in Table 3. Table 3 also shows the results of Example 13.

TABLE 3

| No. | Polymer composition PET (A) (wt %) | Polymer (B) Type | Polymer (B) Amt. (wt %) | TIC added (wt %) | COOH conc. of resin comp. (eq/$10^6$ g) | Content of unreacted TIC in resin comp. (wt %) | Tensile strength of resin comp. (kg/cm$^2$) | COOH conc. of resin comp. after hydrolysis (eq/$10^6$ g) | % BB upon hydrolysis of resin comp. |
|---|---|---|---|---|---|---|---|---|---|
| Comp. Ex. 2 | 100 | — | — | 1.38 | 1 | 0.110 | 610 | 57 | 0.54 |
| Comp. Ex. 9 | 99.9 | HDPE | 0.1 | 1.38 | 0 | 0.119 | 610 | 50 | 0.47 |
| Example 33 | 99.8 | HDPE | 0.2 | 1.38 | 1 | 0.144 | 610 | 35 | 0.34 |
| Example 34 | 99.0 | HDPE | 1.0 | 1.38 | 1 | 0.160 | 610 | 31 | 0.30 |
| Example 11 | 95 | HDPE | 5 | 1.38 | 1 | 0.200 | 590 | 23 | 0.21 |
| Example 35 | 90 | HDPE | 10 | 1.38 | 1 | 0.218 | 560 | 15 | 0.13 |
| Example 36 | 80 | HDPE | 20 | 1.38 | 0 | 0.229 | 540 | 13 | 0.12 |
| Example 37 | 60 | HDPE | 40 | 1.38 | 1 | 0.238 | 510 | 11 | 0.11 |
| Comp. Ex. 10 | 59 | HDPE | 41 | 1.38 | 0 | 0.239 | 400 | 11 | 0.11 |
| Comp. Ex. 11 | 99.9 | PP | 0.1 | 1.38 | 0 | 0.111 | 610 | 52 | 0.50 |
| Example 38 | 99.8 | PP | 0.2 | 1.38 | 0 | 0.150 | 610 | 34 | 0.32 |
| Example 39 | 99.0 | PP | 1.0 | 1.38 | 0 | 0.168 | 610 | 30 | 0.29 |
| Example 12 | 95 | PP | 5 | 1.38 | 0 | 0.202 | 590 | 21 | 0.20 |
| Example 40 | 90 | PP | 10 | 1.38 | 0 | 0.227 | 570 | 15 | 0.13 |
| Example 41 | 80 | PP | 20 | 1.38 | 1 | 0.230 | 550 | 14 | 0.12 |
| Example 42 | 60 | PP | 40 | 1.38 | 0 | 0.239 | 530 | 11 | 0.11 |
| Comp. Ex. 12 | 59 | PP | 41 | 1.38 | 0 | 0.239 | 410 | 12 | 0.11 |
| Comp. Ex. 13 | 99.9 | PS | 0.1 | 1.38 | 1 | 0.113 | 610 | 51 | 0.48 |
| Example 43 | 99.8 | PS | 0.2 | 1.38 | 1 | 0.158 | 610 | 35 | 0.33 |
| Example 44 | 99.0 | PS | 1.0 | 1.38 | 1 | 0.170 | 610 | 30 | 0.28 |
| Example 13 | 95 | PS | 5 | 1.38 | 1 | 0.203 | 590 | 22 | 0.20 |
| Example 45 | 90 | PS | 10 | 1.38 | 0 | 0.229 | 570 | 14 | 0.13 |
| Example 46 | 80 | PS | 20 | 1.38 | 1 | 0.232 | 550 | 13 | 0.12 |
| Example 47 | 60 | PS | 40 | 1.38 | 0 | 0.239 | 520 | 11 | 0.11 |
| Comp. Ex. 14 | 59 | PS | 41 | 1.38 | 0 | 0.240 | 400 | 11 | 0.11 |

EXAMPLES 48–52, COMPARATIVE EXAMPLES 15 and 16

Table 4 lists the properties of polyester compositions obtained in the same manner as in Example 14, except that the amounts of the PET chips and PMPT of Example 14 were changed as listed in Table 4. Table 4 also shows the results of Comparative Example 2 and Example 14.

EXAMPLES 53–57, COMPARATIVE EXAMPLES 17 and 18

Table 4 also lists the properties of polyester compositions obtained in the same manner as in Example 15, except that the amounts of the PET chips and PMMA of Example 15 were changed as listed in Table 4. Table 4 also shows the results of Example 15.

EXAMPLES 58–62, COMPARATIVE EXAMPLES 19 and 20

Table 4 also lists the properties of polyester compositions obtained in the same manner as in Example 16, except that the amounts of the PET chips and ZEONEX 280 of Example 16 were changed as listed in Table 4. Table 4 also shows the results of Example 16.

TABLE 4

| No. | Polymer composition PET (A) (wt %) | Polymer (B) Type | Polymer (B) Amt. (wt %) | TIC added (wt %) | COOH conc. of resin comp. (eq/10⁶ g) | Content of unreacted TIC in resin comp. (wt %) | Tensile strength of resin comp. (kg/cm²) | COOH conc. of resin comp. after hydrolysis (eq/10⁶ g) | % BB upon hydrolysis of resin comp. |
|---|---|---|---|---|---|---|---|---|---|
| Comp. Ex. 2 | 100 | — | — | 1.38 | 1 | 0.110 | 610 | 57 | 0.54 |
| Comp. Ex. 15 | 99.9 | PMPT | 0.1 | 1.38 | 1 | 0.114 | 610 | 52 | 0.49 |
| Example 48 | 99.8 | PMPT | 0.2 | 1.38 | 1 | 0.141 | 610 | 37 | 0.35 |
| Example 49 | 99.0 | PMPT | 1.0 | 1.38 | 1 | 0.157 | 610 | 33 | 0.31 |
| Example 14 | 95 | PMPT | 5 | 1.38 | 0 | 0.200 | 580 | 23 | 0.21 |
| Example 50 | 90 | PMPT | 10 | 1.38 | 1 | 0.215 | 570 | 18 | 0.16 |
| Example 51 | 80 | PMPT | 20 | 1.38 | 0 | 0.220 | 540 | 16 | 0.15 |
| Example 52 | 60 | PMPT | 40 | 1.38 | 1 | 0.230 | 520 | 14 | 0.12 |
| Comp. Ex. 16 | 59 | PMPT | 41 | 1.38 | 0 | 0.231 | 410 | 13 | 0.12 |
| Comp. Ex. 17 | 99.9 | PMMA | 0.1 | 1.38 | 0 | 0.113 | 610 | 51 | 0.49 |
| Example 53 | 99.8 | PMMA | 0.2 | 1.38 | 1 | 0.138 | 610 | 38 | 0.36 |
| Example 54 | 99.0 | PMMA | 1.0 | 1.38 | 1 | 0.155 | 610 | 34 | 0.32 |
| Example 15 | 95 | PMMA | 5 | 1.38 | 1 | 0.203 | 580 | 25 | 0.25 |
| Example 55 | 90 | PMMA | 10 | 1.38 | 1 | 0.212 | 570 | 19 | 0.17 |
| Example 56 | 80 | PMMA | 20 | 1.38 | 0 | 0.217 | 540 | 17 | 0.16 |
| Example 57 | 60 | PMMA | 40 | 1.38 | 0 | 0.226 | 520 | 14 | 0.13 |
| Comp. Ex. 18 | 59 | PMMA | 41 | 1.38 | 0 | 0.229 | 400 | 13 | 0.12 |
| Comp. Ex. 19 | 99.9 | ZEONEX 280 | 0.1 | 1.38 | 0 | 0.126 | 610 | 51 | 0.49 |
| Example 58 | 99.8 | ZEONEX 280 | 0.2 | 1.38 | 0 | 0.150 | 610 | 34 | 0.33 |
| Example 59 | 99.0 | ZEONEX 280 | 1.0 | 1.38 | 1 | 0.175 | 610 | 30 | 0.28 |
| Example 16 | 95 | ZEONEX 280 | 5 | 1.38 | 0 | 0.220 | 590 | 18 | 0.17 |
| Example 60 | 90 | ZEONEX 280 | 10 | 1.38 | 0 | 0.233 | 570 | 14 | 0.13 |
| Example 61 | 80 | ZEONEX 280 | 20 | 1.38 | 1 | 0.236 | 560 | 14 | 0.12 |
| Example 62 | 60 | ZEONEX 280 | 40 | 1.38 | 1 | 0.244 | 530 | 13 | 0.12 |
| Comp. Ex. 20 | 59 | ZEONEX 280 | 41 | 1.38 | 0 | 0.245 | 400 | 12 | 0.11 |

EXAMPLES 63–67, COMPARATIVE EXAMPLES 21 and 22

Table 5 lists the properties of polyester compositions obtained in the same manner as in Example 19, except that the amounts of the PET chips and PMTCDD of Example 19 were changed as listed in Table 5. Table 5 also shows the results of Comparative Example 2 and Example 19.

EXAMPLES 68–72, COMPARATIVE EXAMPLES 23 and 24

Table 5 also lists the properties of polyester compositions obtained in the same manner as in Example 22, except that the amounts of the PET chips and PPCPE of Example 22 were changed as listed in Table 5. Table 5 also shows the results of Example 22.

TABLE 5

| No. | Polymer composition PET (A) (wt %) | Polymer (B) Type | Polymer (B) Amt. (wt %) | TIC added (wt %) | COOH conc. of resin comp. (eq/10⁶ g) | Content of unreacted TIC in resin comp. (wt %) | Tensile strength of resin comp. (kg/cm²) | COOH conc. of resin comp. after hydrolysis (eq/10⁶ g) | % BB upon hydrolysis of resin comp. |
|---|---|---|---|---|---|---|---|---|---|
| Comp. Ex. 2 | 100 | — | — | 1.38 | 1 | 0.110 | 610 | 57 | 0.54 |
| Comp. Ex. 21 | 99.9 | PMTCDD | 0.1 | 1.38 | 0 | 0.115 | 610 | 51 | 0.49 |
| Example 63 | 99.8 | PMTCDD | 0.2 | 1.38 | 1 | 0.140 | 610 | 34 | 0.32 |
| Example 64 | 99.0 | PMTCDD | 1.0 | 1.38 | 1 | 0.159 | 610 | 31 | 0.29 |
| Example 19 | 95 | PMTCDD | 5 | 1.38 | 0 | 0.213 | 580 | 18 | 0.17 |
| Example 65 | 90 | PMTCDD | 10 | 1.38 | 0 | 0.223 | 560 | 15 | 0.14 |
| Example 66 | 80 | PMTCDD | 20 | 1,38 | 0 | 0.230 | 530 | 14 | 0.13 |
| Example 67 | 60 | PMTCDD | 40 | 1.38 | 1 | 0.234 | 510 | 13 | 0.12 |
| Comp. Ex. 22 | 59 | PMTCDD | 41 | 1.38 | 0 | 0.236 | 400 | 12 | 0.12 |
| Comp. Ex. 23 | 99.9 | PPCPE | 0.1 | 1.38 | 1 | 0.126 | 610 | 50 | 0.47 |
| Example 68 | 99.8 | PPCPE | 0.2 | 1.38 | 0 | 0.150 | 610 | 32 | 0.31 |
| Example 69 | 99.0 | PPCPE | 1.0 | 1.38 | 1 | 0.175 | 610 | 29 | 0.27 |
| Example 22 | 95 | PPCPE | 5 | 1.38 | 0 | 0.210 | 580 | 19 | 0.18 |
| Example 70 | 90 | PPCPE | 10 | 1.38 | 1 | 0.233 | 580 | 13 | 0.12 |
| Example 71 | 80 | PPCPE | 20 | 1.38 | 1 | 0.236 | 560 | 13 | 0.12 |
| Example 72 | 60 | PPCPE | 40 | 1.38 | 1 | 0.244 | 530 | 12 | 0.11 |
| Comp. Ex. 24 | 59 | PPCPE | 41 | 1.38 | 1 | 0.245 | 410 | 12 | 0.11 |

EXAMPLES 73-84, COMPARATIVE EXAMPLES 25-32

Table 6 lists the properties of polyester compositions obtained in the same manner as in Examples 1, 4, 11 and 12 except that the respective amounts of TIC added in Examples 1, 4, 11 and 12 were changed as listed in Table 6. Table 6 also shows the results of Examples 1, 4, 11 and 12.

TABLE 6

| No. | Polymer composition PET (A) (wt %) | Polymer (B) Type | Amt. (wt %) | TIC added (wt %) | COOH conc. of resin comp. (eq/$10^6$ g) | Content of unreacted TIC in resin comp. (wt %) | Tensile strength of resin comp. (kg/cm$^2$) | COOH conc. of resin comp. after hydrolysis (eq/$10^6$ g) | % BB upon hydrolysis of resin comp. |
|---|---|---|---|---|---|---|---|---|---|
| Comp. Ex. 25 | 95 | PETCD | 5 | 0.60 | 13 | 0.003 | 590 | 64 | 0.49 |
| Example 73 | 95 | PETCD | 5 | 0.75 | 9 | 0.005 | 590 | 43 | 0.33 |
| Example 74 | 95 | PETCD | 5 | 0.85 | 6 | 0.011 | 590 | 32 | 0.25 |
| Example 1 | 95 | PETCD | 5 | 1.38 | 1 | 0.215 | 590 | 19 | 0.17 |
| Example 75 | 95 | PETCD | 5 | 3.50 | 0 | 1.415 | 530 | 8 | 0.08 |
| Comp. Ex. 26 | 95 | PETCD | 5 | 4.00 | 0 | 1.608 | 400 | 4 | 0.04 |
| Comp. Ex. 27 | 95 | APEL 6015 | 5 | 0.60 | 13 | 0.003 | 590 | 63 | 0.48 |
| Example 76 | 95 | APEL 6015 | 5 | 0.75 | 9 | 0.006 | 590 | 42 | 0.32 |
| Example 77 | 95 | APEL 6015 | 5 | 0.85 | 5 | 0.011 | 590 | 31 | 0.25 |
| Example 4 | 95 | APEL 6015 | 5 | 1.38 | 1 | 0.221 | 590 | 17 | 0.15 |
| Example 78 | 95 | APEL 6015 | 5 | 3.50 | 1 | 1.420 | 540 | 8 | 0.07 |
| Comp. Ex. 28 | 95 | APEL 6015 | 5 | 4.00 | 0 | 1.605 | 380 | 4 | 0.04 |
| Comp. Ex. 29 | 95 | HDPE | 5 | 0.63 | 13 | 0.003 | 580 | 65 | 0.50 |
| Example 79 | 95 | HDPE | 5 | 0.78 | 9 | 0.005 | 580 | 44 | 0.34 |
| Example 80 | 95 | HDPE | 5 | 0.88 | 6 | 0.011 | 580 | 33 | 0.26 |
| Example 11 | 95 | HDPE | 5 | 1.38 | 1 | 0.200 | 580 | 23 | 0.21 |
| Example 81 | 95 | HDPE | 5 | 3.55 | 0 | 1.420 | 520 | 10 | 0.10 |
| Comp. Ex. 30 | 95 | HDPE | 5 | 4.05 | 0 | 1.599 | 360 | 6 | 0.06 |
| Comp. Ex. 31 | 95 | PP | 5 | 0.63 | 13 | 0.003 | 580 | 64 | 0.49 |
| Example 82 | 95 | PP | 5 | 0.78 | 9 | 0.006 | 580 | 44 | 0.34 |
| Example 83 | 95 | PP | 5 | 0.88 | 5 | 0.011 | 580 | 33 | 0.27 |
| Example 12 | 95 | PP | 5 | 1.38 | 0 | 0.202 | 580 | 21 | 0.20 |
| Example 84 | 95 | PP | 5 | 3.55 | 0 | 1.415 | 520 | 9 | 0.09 |
| Comp. Ex. 32 | 95 | PP | 5 | 4.05 | 0 | 1.595 | 360 | 5 | 0.05 |

EXAMPLES 85-93, COMPARATIVE EXAMPLES 33-38

Table 7 lists the properties of polyester compositions obtained in the same manner as in Examples 13-15 except that the respective amounts of TIC added in Examples 13-15 were changed as listed in Table 7. Table 7 also shows the results of Examples 13-15.

TABLE 7

| No. | Polymer composition PET (A) (wt %) | Polymer (B) Type | Amt. (wt %) | TIC added (wt %) | COOH conc. of resin comp. (eq/$10^6$ g) | Content of unreacted TIC in resin comp. (wt %) | Tensile strength of resin comp. (kg/cm$^2$) | COOH conc. of resin comp. after hydrolysis (eq/$10^6$ g) | % BB upon hydrolysis of resin comp. |
|---|---|---|---|---|---|---|---|---|---|
| Comp. Ex. 33 | 95 | PS | 5 | 0.63 | 13 | 0.003 | 580 | 64 | 0.49 |
| Example 85 | 95 | PS | 5 | 0.78 | 9 | 0.006 | 580 | 44 | 0.34 |
| Example 86 | 95 | PS | 5 | 0.88 | 5 | 0.011 | 580 | 33 | 0.27 |
| Example 13 | 95 | PS | 5 | 1.38 | 1 | 0.203 | 580 | 22 | 0.20 |
| Example 87 | 95 | PS | 5 | 3.55 | 1 | 1.413 | 520 | 10 | 0.09 |
| Comp. Ex. 34 | 95 | PS | 5 | 4.05 | 0 | 1.591 | 360 | 5 | 0.05 |
| Comp. Ex. 35 | 95 | PMPT | 5 | 0.63 | 13 | 0.003 | 590 | 66 | 0.51 |
| Example 88 | 95 | PMPT | 5 | 0.78 | 9 | 0.006 | 590 | 45 | 0.35 |
| Example 89 | 95 | PMPT | 5 | 0.88 | 6 | 0.011 | 590 | 34 | 0.27 |
| Example 14 | 95 | PMPT | 5 | 1.38 | 0 | 0.200 | 580 | 23 | 0.21 |
| Example 90 | 95 | PMPT | 5 | 3.55 | 1 | 1.420 | 540 | 11 | 0.10 |
| Comp. Ex. 36 | 95 | PMPT | 5 | 4.05 | 0 | 1.604 | 380 | 6 | 0.06 |

TABLE 7-continued

|  | Polymer composition | | TIC added (wt %) | COOH conc. of resin comp. (eq/10⁶ g) | Content of unreacted TIC in resin comp. (wt %) | Tensile strength of resin comp. (kg/cm²) | COOH conc. of resin comp. after hydrolysis (eq/10⁶ g) | % BB upon hydrolysis of resin comp. |
|---|---|---|---|---|---|---|---|---|
| No. | PET (A) (wt %) | Polymer (B) Type / Amt. (wt %) | | | | | | |
| Comp. Ex. 37 | 95 | PMMA  5 | 0.63 | 13 | 0.003 | 580 | 66 | 0.51 |
| Example 91 | 95 | PMMA  5 | 0.78 | 9 | 0.005 | 580 | 47 | 0.36 |
| Example 92 | 95 | PMMA  5 | 0.88 | 6 | 0.011 | 580 | 35 | 0.28 |
| Example 15 | 95 | PMMA  5 | 1.38 | 1 | 0.203 | 580 | 25 | 0.25 |
| Example 93 | 95 | PMMA  5 | 3.55 | 1 | 1.420 | 520 | 12 | 0.11 |
| Comp. Ex. 38 | 95 | PMMA  5 | 4.05 | 0 | 1.600 | 360 | 7 | 0.07 |

EXAMPLES 94–102, COMPARATIVE EXAMPLES 39–44

Table 8 lists the properties of polyester compositions obtained in the same manner as in Examples 16, 19 and 22 except that the respective amounts of TIC added in Examples 16, 19 and 22 were changed as listed in Table 8. Table 8 also shows the results of Examples 16, 19 and 22.

TABLE 8

|  | Polymer composition | | TIC added (wt %) | COOH conc. of resin comp. (eq/10⁶ g) | Content of unreacted TIC in resin comp. (wt %) | Tensile strength of resin comp. (kg/cm²) | COOH conc. of resin comp. after hydrolysis (eq/10⁶ g) | % BB upon hydrolysis of resin comp. |
|---|---|---|---|---|---|---|---|---|
| No. | PET (A) (wt %) | Polymer (B) Type / Amt. (wt %) | | | | | | |
| Comp. Ex. 39 | 95 | ZEONEX 280  5 | 0.60 | 13 | 0.003 | 590 | 64 | 0.48 |
| Example 94 | 95 | ZEONEX 280  5 | 0.75 | 9 | 0.005 | 590 | 44 | 0.34 |
| Example 95 | 95 | ZEONEX 280  5 | 0.85 | 6 | 0.011 | 590 | 33 | 0.24 |
| Example 16 | 95 | ZEONEX 280  5 | 1.38 | 0 | 0.220 | 590 | 22 | 0.17 |
| Example 96 | 95 | ZEONEX 280  5 | 3.50 | 0 | 1.411 | 530 | 10 | 0.08 |
| Comp. Ex. 40 | 95 | ZEONEX 280  5 | 4.00 | 0 | 1.600 | 370 | 5 | 0.04 |
| Comp. Ex. 41 | 95 | PMTCDD  5 | 0.60 | 13 | 0.003 | 590 | 66 | 0.50 |
| Example 97 | 95 | PMTCDD  5 | 0.75 | 9 | 0.006 | 590 | 45 | 0.32 |
| Example 98 | 95 | PMTCDD  5 | 0.85 | 6 | 0.011 | 590 | 34 | 0.25 |
| Example 19 | 95 | PMTCDD  5 | 1.38 | 0 | 0.213 | 580 | 23 | 0.17 |
| Example 99 | 95 | PMTCDD  5 | 3.50 | 1 | 1.420 | 540 | 11 | 0.07 |
| Comp. Ex. 42 | 95 | PMTCDD  5 | 4.00 | 0 | 1.604 | 380 | 6 | 0.03 |
| Comp. Ex. 43 | 95 | PPCPE  5 | 0.60 | 13 | 0.003 | 580 | 66 | 0.51 |
| Example 100 | 95 | PPCPE  5 | 0.75 | 9 | 0.005 | 580 | 47 | 0.33 |
| Example 101 | 95 | PPCPE  5 | 0.85 | 6 | 0.011 | 580 | 35 | 0.27 |
| Example 22 | 95 | PPCPE  5 | 1.38 | 0 | 0.210 | 580 | 25 | 0.18 |
| Example 102 | 95 | PPCPE  5 | 3.50 | 1 | 1.420 | 520 | 12 | 0.08 |
| Comp. Ex. 44 | 95 | PPCPE  5 | 4.00 | 0 | 1.600 | 360 | 7 | 0.04 |

EXAMPLE 103

Table 9 lists the properties of a polyester composition obtained in the same manner as in Example 1 except that TIC in Example 1 was replaced with N,N'-di-o-tolylcarbodiimide (hereunder, "OTC") which was added in the amount listed in Table 9.

COMPARATIVE EXAMPLE 45

Table 9 also shows the properties of a polyester composition obtained in the same manner as in Example 103, except that the PETCD in Example 103 was not included in the blend.

TABLE 9

| No. | Polymer composition PET (A) (wt %) | Polymer (B) Type | Polymer (B) Amt. (wt %) | Carbodiimide compound Type | Carbodiimide compound Amt. (wt %) | COOH conc. of resin comp. (eq/10⁶ g) | Content of unreacted OTC in resin comp. (wt %) | Tensile strength of resin comp. (kg/cm²) | COOH conc. of resin comp. after hydrolysis (eq/10⁶ g) | % BB upon hydrolysis of resin comp. |
|---|---|---|---|---|---|---|---|---|---|---|
| Example 103 | 95 | PETCD | 5 | OTC | 1.3 | 1 | 0.160 | 590 | 36 | 0.34 |
| Comp. Ex. 45 | 100 | — | 5 | OTC | 1.3 | 1 | 1.108 | 610 | 54 | 0.51 |

EXAMPLE 104

Five parts by weight of PETCD chips and 1.38 parts by weight of TIC flakes were mixed and kneaded for about 3 minutes at 285° C. in a single screw extruder and then extruded from the end of the extruder into a gut and cooled, and thereafter cut to obtain PETCD master pellets containing 21.63 wt % of TIC.

Next, 95 parts by weight of PET chips and 6.38 parts by weight of the above-mentioned master pellets were weighed out while they were fed to a single screw extruder via the hopper and a polymer tube below the hopper of the single screw extruder, and were kneaded at about 285° C. for 3 minutes in the single screw extruder, otherwise following the method of Example 1 to obtain a polyester composition by the master pellet process, with the properties listed in Table 10. Table 10 also shows the results for a polyester composition obtained by the extruder process in Example 1.

EXAMPLE 105

Table 10 also lists the properties of a polyester composition obtained in the same manner as in Example 104 except that the TIC in Example 104 was replaced with 1.3 parts by weight of OTC. Table 10 also lists the results for a polyester composition obtained by the extruder process in Example 103.

EXAMPLE 106

There were measured out 95 parts by weight of PET chips and 5 parts by weight of PETCD chips while they were fed to a single screw extruder via the hopper and a polymer tube below the hopper of the single screw extruder. At the same time, liquid TIC was fed to the above-mentioned chip mixture in the polymer tube under the hopper in an amount of 1.38 parts by weight with respect to the 100 parts by weight of the chip mixture. The PET chips, PETCD chips and liquid TIC were kneaded for 3 minutes at about 285° C. in the single screw extruder to obtain a polymer melt which was sent by the action of a gear pump through the filtration layer inside a spinning pack and a streamline switcher ("Static Mixer", product of U.S. Chemix Co.) and then spun out from a nozzle. The spun filament was then cooled in a hot bath at about 80° C. and drawn by a normal method to a final length of 5.0-fold and thermoset, to obtain a polyester monofilament with a diameter of 0.4 mm by the extruder method. The tensile strength of the monofilament, the content of unreacted TIC in the monofilament, and the degree of strength retention of the monofilament upon treatment in saturated water vapor at 121° C. for 10, 12, 15 and 22 days are listed in Table 11 as measurements of the resistance to hydrolysis. Higher values of strength retention indicate superior resistance to hydrolysis.

COMPARATIVE EXAMPLE 46

Table 11 also shows the properties of a polyester monofilament obtained in the same manner as in Example 106 except that the PETCD chips and TIC of Example 106 were not added.

COMPARATIVE EXAMPLE 47

Table 11 also shows the properties of a polyester monofilament obtained in the same manner as in Example 106 except that the PETCD chips of Example 106 were not added.

TABLE 10

| No. | Process for producing polymer composition | Carbodiimide compound Type | Carbodiimide compound Amt (wt %) | COOH conc. of resin comp. (eq/10⁶ g) | Content of unreacted carbodiimide in resin comp. (wt %) | Tensile strength of resin comp. (kg/cm²) | COOH conc. of resin comp. after hydrolysis (eq/10⁶ g) | % BB upon hydrolysis of resin comp. |
|---|---|---|---|---|---|---|---|---|
| Example 104 | Master pellet process | TIC | 1.38 | 0 | 0.220 | 590 | 16 | 0.15 |
| Example 1 | Extruder process | TIC | 1.38 | 1 | 0.215 | 590 | 19 | 0.17 |
| Example 105 | Master pellet process | OTC | 1.3 | 0 | 0.165 | 590 | 33 | 0.32 |
| Example 103 | Extruder process | OTC | 1.3 | 1 | 0.160 | 590 | 36 | 0.34 |

COMPARATIVE EXAMPLE 48

Table 11 also shows the properties of a polyester monofilament obtained in the same manner as in Example 106 except that the TIC of Example 106 was not added.

EXAMPLES 107–115

Table 11 also lists the properties of polyester monofilaments obtained in the same manner as in Example 106, except that the PETCD chips of Example 106 were replaced with PHPhBH (Example 107), PETCDB (Example 108), APEL 6015 (Example 109), APEL 6013 (Example 110), APEL 6011 (Example 111), APEL 6509 (Example 112), APEL 150R (Example 113), APEL 130A (Example 114) and APEL 210A (Example 115).

EXAMPLES 116–120

Table 11 also lists the properties of polyester monofilaments obtained in the same manner as in Example 106 except that the PETCD chips of Example 106 were replaced with HDPE (Example 116), PP (Example 117), PS (Example 118), PMPT (Example 119) and PMMA (Example 120).

EXAMPLES 121 and 122

Table 11 also lists the properties of polyester monofilaments obtained in the same manner as in Example 106 except that the PETCD chips of Example 106 were replaced with ZEONEX 280 (Example 121) and ZEONEX 250 (Example 122).

EXAMPLES 123–125

Table 11 also lists the properties of polyester monofilaments obtained in the same manner as in Example 106 except that the PETCD chips of Example 106 were replaced with PMTCHP (Example 123), PMTCDD (Example 124) and PCTCDD (Example 125).

EXAMPLES 126 and 127

Table 11 also lists the properties of polyester monofilaments obtained in the same manner as in Example 106 except that the PETCD chips of Example 106 were replaced with PDCP (Example 126) and PPCPE (Example 127).

COMPARATIVE EXAMPLE 49

Table 11 also lists the properties of a polyester monofilament obtained in the same manner as in Example 106 except that the PETCD chips of Example 106 were replaced with ETFE.

TABLE 11

| No. | Polymer composition PET (A) (wt %) | Polymer (B) Type | Amt. (wt %) | TIC added (wt %) | COOH conc. of mono-filaments (eq/10$^6$ g) | Unreacted TIC in mono-filaments (wt %) | Monofilament: Strength (g/d) | Duc-tility (%) | Strength retention upon hydrolysis of monofilaments (%) 10th day | 12th day | 15th day | 22nd day |
|---|---|---|---|---|---|---|---|---|---|---|---|---|
| Comp. Ex. 46 | 100 | — | — | — | 17 | — | 5.29 | 35.5 | 0*$^1$ | — | — | — |
| Comp. Ex. 47 | 100 | — | — | 1.38 | 1 | 0.110 | 5.26 | 34.4 | 86.5 | 72.0 | 0*$^1$ | — |
| Comp. Ex. 48 | 95 | PETCD | 5 | — | 16 | — | 5.06 | 34.5 | 0*$^1$ | — | — | — |
| Example 106 | 95 | PETCD | 5 | 1.38 | 1 | 0.215 | 5.08 | 34.3 | 97.7 | 94.1 | 89.2 | 68.5 |
| Example 107 | 95 | PHPhBH | 5 | 1.38 | 1 | 0.203 | 5.05 | 34.4 | 95.2 | 93.0 | 88.4 | 65.9 |
| Example 108 | 95 | PETVDB | 5 | 1.38 | 0 | 0.210 | 5.07 | 34.2 | 96.5 | 94.6 | 88.5 | 65.2 |
| Example 109 | 95 | APEL 6015 | 5 | 1.38 | 1 | 0.221 | 5.08 | 34.5 | 97.8 | 94.4 | 89.9 | 70.2 |
| Example 110 | 95 | APEL 6013 | 5 | 1.38 | 0 | 0.215 | 5.08 | 34.5 | 97.5 | 93.9 | 89.5 | 69.5 |
| Example 111 | 95 | APEL 6011 | 5 | 1.38 | 0 | 0.216 | 5.06 | 34.4 | 97.1 | 93.1 | 88.5 | 67.3 |
| Example 112 | 95 | APEL 6509 | 5 | 1.38 | 0 | 0.213 | 5.07 | 34.6 | 96.8 | 94.5 | 87.7 | 65.9 |
| Example 113 | 95 | APEL 150R | 5 | 1.38 | 1 | 0.205 | 5.04 | 34.1 | 97.2 | 92.9 | 87.1 | 63.1 |
| Example 114 | 95 | APEL 130A | 5 | 1.38 | 0 | 0.209 | 5.03 | 34.2 | 95.5 | 94.7 | 86.1 | 65.0 |
| Example 115 | 95 | APEL 210A | 5 | 1.38 | 0 | 0.209 | 5.03 | 34.2 | 95.4 | 94.8 | 86.0 | 65.2 |
| Example 116 | 95 | HDPE | 5 | 1.38 | 1 | 0.200 | 5.04 | 34.5 | 97.2 | 92.9 | 87.1 | 63.1 |
| Example 117 | 95 | PP | 5 | 1..38 | 0 | 0.202 | 5.05 | 34.4 | 94.2 | 91.0 | 86.4 | 61.5 |
| Example 118 | 95 | PS | 5 | 1.38 | 1 | 0.203 | 5.04 | 34.1 | 95.0 | 92.3 | 86.9 | 62.8 |
| Example 119 | 95 | PMPT | 5 | 1.38 | 0 | 0.200 | 5.03 | 34.4 | 94.0 | 92.5 | 86.0 | 61.2 |
| Example 120 | 95 | PMMA | 5 | 1.38 | 1 | 0.203 | 5.04 | 34.3 | 93.0 | 91.7 | 83.6 | 56.8 |
| Example 121 | 95 | ZEONEX 280 | 5 | 1.38 | 0 | 0.220 | 5.08 | 34.4 | 97.5 | 94.3 | 89.0 | 70.0 |
| Example 122 | 95 | ZEONEX 250 | 5 | 1.38 | 1 | 0.216 | 5.07 | 34.5 | 97.4 | 93.4 | 89.2 | 69.4 |
| Example 123 | 95 | PMTCHP | 5 | 1.38 | 0 | 0.215 | 5.07 | 34.6 | 96.8 | 93.5 | 87.2 | 68.9 |
| Example 124 | 95 | PMTCDD | 5 | 1.38 | 0 | 0.213 | 5.03 | 34.5 | 96.1 | 94.7 | 88.4 | 65.3 |

TABLE 11-continued

| | Polymer composition | | | COOH conc. TIC added (wt %) | Unreacted TIC in mono- filaments (wt %) | Monofilament: | | Strength retention upon hydrolysis of monofilaments (%) | | | |
|---|---|---|---|---|---|---|---|---|---|---|---|
| | PET | Polymer (B) | | TIC | | | Duc- | | | | |
| No. | (A) (wt %) | Type | Amt. (wt %) | added (wt %) | filaments (eq/10⁶ g) | mono- filaments (wt %) | Strength (g/d) | tility (%) | 10th day | 12th day | 15th day | 22nd day |
| Example 125 | 95 | PCTCDD | 5 | 1.38 | 0 | 0.206 | 5.02 | 34.2 | 95.4 | 93.8 | 86.0 | 65.2 |
| Example 126 | 95 | PDCP | 5 | 1.38 | 1 | 0.209 | 5.03 | 34.3 | 95.5 | 94.0 | 86.1 | 65.3 |
| Example 127 | 95 | PPCPE | 5 | 1.38 | 0 | 0.210 | 5.05 | 34.2 | 95.1 | 92.0 | 85.4 | 63.0 |
| Comp. Ex. 49 | 95 | ETFE | 5 | 1.38 | 0 | 0.115 | 5.07 | 34.4 | 88.3 | 76.2 | 0*¹ | — |

*¹: Deterioration too great for measurement.

EXAMPLES 128–132, COMPARATIVE EXAMPLES 50 and 51

Table 12 lists the properties of polyester monofilaments obtained in the same manner as in Example 106, except that the amounts of the PET chips and PETCD chips of Example 106 were changed as listed in Table 12. Table 12 also shows the results of Comparative Example 47 and Example 106.

EXAMPLES 133–137, COMPARATIVE EXAMPLES 52 and 53

Table 12 also lists the properties of polyester monofilaments obtained in the same manner as in Example 109, except that the amounts of the PET chips and APEL 6015 of Example 109 were changed as listed in Table 12. Table 12 also shows the results of Example 190.

TABLE 12

| | Polymer composition | | | COOH conc. TIC added (wt %) | Unreacted TIC in mono- filaments (wt %) | Monofilament: | | Strength retention upon hydrolysis of monofilaments (%) | | | |
|---|---|---|---|---|---|---|---|---|---|---|---|
| | PET | Polymer (B) | | TIC | | | Duc- | | | | |
| No. | (A) (wt %) | Type | Amt. (wt %) | added (wt %) | filaments (eq/10⁶ g) | mono- filaments (wt %) | Strength (g/d) | tility (%) | 10th day | 12th day | 15th day | 22nd day |
| Comp. Ex. 47 | 100 | — | — | 1.38 | 1 | 0.110 | 5.26 | 34.4 | 86.5 | 72.0 | 0*¹ | — |
| Comp. Ex. 50 | 99.9 | PETCD | 0.1 | 1.38 | 1 | 0.128 | 5.21 | 34.4 | 89.9 | 80.2 | 0*¹ | — |
| Example 128 | 99.8 | PETCD | 0.2 | 1.38 | 1 | 0.150 | 5.16 | 34.4 | 90.5 | 84.4 | 64.1 | 41.3 |
| Example 129 | 99.0 | PETCD | 1.0 | 1.38 | 0 | 0.175 | 5.12 | 34.5 | 90.0 | 86.1 | 80.2 | 59.5 |
| Example 106 | 95 | PETCD | 5 | 1.38 | 1 | 0.215 | 5.08 | 34.3 | 97.7 | 94.1 | 89.2 | 68.5 |
| Example 130 | 90 | PETCD | 10 | 1.38 | 1 | 0.230 | 5.02 | 34.1 | 91.1 | 94.8 | 89.6 | 69.2 |
| Example 131 | 80 | PETCD | 20 | 1.38 | 0 | 0.238 | 4.79 | 34.0 | 98.6 | 95.2 | 90.2 | 70.4 |
| Example 132 | 60 | PETCD | 40 | 1.38 | 0 | 0.245 | 4.56 | 33.1 | 98.4 | 96.2 | 90.9 | 71.2 |
| Comp. Ex. 51 | 59 | PETCD | 41 | 1.38 | 0 | 0.246 | 3.49 | 26.1 | 99.0 | 96.9 | 91.3 | 72.0 |
| Comp. Ex. 52 | 99.9 | APEL 6015 | 0.1 | 1.38 | 0 | 0.127 | 5.22 | 34.5 | 89.8 | 80.1 | 0*¹ | — |
| Example 133 | 96.8 | APEL 6015 | 0.2 | 1.38 | 1 | 0.151 | 5.16 | 34.4 | 90.6 | 84.5 | 64.3 | 41.8 |
| Example 134 | 99.0 | APEL 6015 | 1.0 | 1.38 | 0 | 0.174 | 5.13 | 34.4 | 90.2 | 86.5 | 80.4 | 59.9 |
| Example 109 | 95 | APEL 6015 | 5 | 1.38 | 1 | 0.221 | 5.08 | 34.5 | 97.8 | 94.4 | 89.9 | 70.2 |
| Example 135 | 90 | APEL 6015 | 10 | 1.38 | 1 | 0.231 | 5.03 | 34.2 | 98.3 | 94.8 | 89.8 | 69.3 |
| Example 136 | 80 | APEL 6015 | 20 | 1.38 | 1 | 0.239 | 4.79 | 34.1 | 98.8 | 95.4 | 90.5 | 70.6 |
| Example 137 | 60 | APEL 6015 | 40 | 1.38 | 0 | 0.245 | 4.58 | 33.3 | 99.09 | 96.5 | 91.2 | 72.1 |
| Comp. Ex. 53 | 59 | APEL 6015 | 41 | 1.38 | 1 | 0.245 | 3.45 | 25.1 | 99.2 | 97.00 | 91.55 | 72.3 |

*¹: Deterioration too great for measurement.

EXAMPLES 138–142, COMPARATIVE EXAMPLES 54 and 55

Table 13 lists the properties of polyester monofilaments obtained in the same manner as in Example 116, except that the amounts of the PET chips and HDPE of Example 116 were changed as listed in Table 13. Table 13 also shows the results of Comparative Example 47 and Example 116.

EXAMPLES 143–147, COMPARATIVE EXAMPLES 56 and 57

Table 13 also lists the properties of polyester monofilaments obtained in the same manner as in Example 117, except that the amounts of the PET chips and PP of Example 117 were changed as listed in Table 13. Table 13 also shows the results of Example 117.

EXAMPLES 148–122, COMPARATIVE EXAMPLES 58 and 59

Table 13 also lists the properties of polyester monofilaments obtained in the same manner as in Example 118, except that the amounts of the PET chips and PS of Example 118 were changed as listed in Table 13. Table 13 also shows the results of Example 118.

TABLE 13

| | Polymer composition | | TIC added (wt %) | COOH conc. of mono-filaments (eq/$10^6$ g) | Unreacted TIC in mono-filaments (wt %) | Monofilament: | | Strength retention upon hydrolysis of monofilaments (%) | | | |
|---|---|---|---|---|---|---|---|---|---|---|---|
| | PET (A) (wt %) | Polymer (B) | | | | Strength (g/d) | Duc-tility (%) | 10th day | 12th day | 15th day | 22nd day |
| No. | | Type | Amt. (wt %) | | | | | | | | | |
| Comp. Ex. 47 | 100 | — | — | 1.38 | 1 | 0.110 | 5.26 | 34.4 | 86.5 | 72.0 | 0*[1] | — |
| Comp. Ex. 54 | 99.9 | HDPE | 0.1 | 1.38 | 0 | 0.119 | 5.20 | 34.2 | 88.00 | 76.1 | 0*[1] | — |
| Example 138 | 99.8 | HDPE | 0.2 | 1.38 | 1 | 0.144 | 5.14 | 34.4 | 89.0 | 82.1 | 60.2 | 39.5 |
| Example 139 | 99.0 | HDPE | 1.0 | 1.38 | 1 | 0.160 | 5.10 | 34.5 | 90.0 | 85.0 | 76.1 | 56.8 |
| Example 116 | 95 | HDPE | 5 | 1.38 | 1 | 0.200 | 5.04 | 34.5 | 97.2 | 92.9 | 87.1 | 63.1 |
| Example 140 | 90 | HDPE | 10 | 1.38 | 1 | 0.218 | 5.00 | 34.1 | 97.7 | 93.3 | 88.4 | 64.2 |
| Example 141 | 80 | HDPE | 20 | 1.38 | 0 | 0.229 | 4.72 | 34.1 | 98.0 | 93.9 | 89.5 | 68.0 |
| Example 142 | 60 | HDPE | 40 | 1.38 | 1 | 0.238 | 4.50 | 32.2 | 98.8 | 95.2 | 90.1 | 69.3 |
| Comp. Ex. 55 | 59 | HDPE | 41 | 1.38 | 0 | 0.239 | 3.30 | 25.2 | 98.9 | 95.4 | 91.0 | 69.5 |
| Comp. Ex. 56 | 99.9 | PP | 0.1 | 1.38 | 0 | 0.111 | 5.20 | 34.2 | 88.0 | 76.1 | 0*[1] | — |
| Example 143 | 99.8 | PP | 0.2 | 1.38 | 0 | 0.150 | 5.14 | 34.4 | 89.0 | 82.1 | 60.2 | 39.5 |
| Example 144 | 99.0 | PP | 1.0 | 1.38 | 0 | 0.168 | 5.10 | 34.5 | 90.0 | 85.0 | 76.1 | 56.8 |
| Example 117 | 95 | PP | 5 | 1.38 | 0 | 0.202 | 5.05 | 34.4 | 94.2 | 91.0 | 86.4 | 61.5 |
| Example 145 | 90 | PP | 10 | 1.38 | 0 | 0.227 | 5.01 | 34.2 | 97.7 | 93.5 | 88.6 | 64.7 |
| Example 146 | 80 | PP | 20 | 1.38 | 1 | 0.230 | 4.70 | 34.1 | 98.2 | 93.8 | 89.8 | 68.3 |
| Example 147 | 60 | PP | 40 | 1.38 | 0 | 0.239 | 4.52 | 32.3 | 98.6 | 95.6 | 90.0 | 69.5 |
| Comp. Ex. 57 | 59 | PP | 41 | 1.38 | 0 | 0.239 | 3.30 | 25.4 | 98.8 | 95.4 | 91.2 | 69.4 |
| Comp. Ex. 58 | 99.9 | PS | 0.1 | 1.38 | 1 | 0.113 | 5.21 | 34.1 | 88.0 | 76.1 | 0*[1] | — |
| Example 148 | 99.8 | PS | 0.2 | 1.38 | 1 | 0.158 | 5.14 | 34.4 | 89.0 | 82.1 | 60.2 | 39.5 |
| Example 149 | 99.0 | PS | 1.0 | 1.38 | 1 | 0.170 | 5.08 | 34.2 | 90.0 | 85.0 | 76.1 | 56.8 |
| Example 118 | 95 | PS | 5 | 1.38 | 1 | 0.203 | 5.04 | 34.1 | 95.0 | 92.3 | 86.9 | 62.8 |
| Example 150 | 90 | PS | 10 | 1.38 | 0 | 0.229 | 4.97 | 34.0 | 97.7 | 93.5 | 88.6 | 64.7 |
| Example 151 | 80 | PS | 20 | 1.38 | 1 | 0.232 | 4.68 | 34.1 | 98.2 | 93.8 | 89.8 | 68.3 |
| Example 152 | 60 | PS | 40 | 1.38 | 0 | 0.239 | 4.47 | 32.7 | 98.6 | 95.6 | 90.0 | 69.5 |
| Comp. Ex. 59 | 59 | PS | 41 | 1.38 | 0 | 0.240 | 3.23 | 24.6 | 98.8 | 95.4 | 91.2 | 69.3 |

*[1]: Deterioration too great for measurement.

EXAMPLES 153–157, COMPARATIVE EXAMPLES 60 and 61

Table 14 lists the properties of polyester monofilaments obtained in the same manner as in Example 119, except that the amounts of the PET chips and PMPT of Example 119 were changed as listed in Table 14. Table 14 also shows the results of Comparative Example 47 and Example 119.

EXAMPLES 158–162, COMPARATIVE EXAMPLES 62 and 63

Table 14 also lists the properties of polyester monofilaments obtained in the same manner as in Example 120, except that the amounts of the PET chips and PMMA of Example 120 were changed as listed in Table 14. Table 14 also shows the results of Example 120.

EXAMPLES 163–167, COMPARATIVE EXAMPLES 64 and 65

Table 14 also lists the properties of polyester monofilaments obtained in the same manner as in Example 121, except that the amounts of the PET chips and ZEONEX 280 of Example 121 were changed as listed in Table 14. Table 14 also shows the results of Example 121.

TABLE 14

| No. | Polymer composition PET (A) (wt %) | Polymer (B) Type | Polymer (B) Amt. (wt %) | TIC added (wt %) | COOH conc. of mono-filaments (eq/10⁶ g) | Unreacted TIC in mono-filaments (wt %) | Monofilament: Strength (g/d) | Monofilament: Duc-tility (%) | Strength retention upon hydrolysis of monofilaments (%) 10th day | 12th day | 15th day | 22nd day |
|---|---|---|---|---|---|---|---|---|---|---|---|---|
| Comp. Ex. 47 | 100 | — | — | 1.38 | 1 | 0.110 | 5.26 | 34.4 | 86.5 | 72.0 | 0*¹ | — |
| Comp. Ex. 60 | 99.9 | PMPT | 0.1 | 1.38 | 1 | 0.114 | 5.20 | 34.2 | 87.1 | 75.3 | 0*¹ | — |
| Example 153 | 99.8 | PMPT | 0.2 | 1.38 | 1 | 0.141 | 5.14 | 34.4 | 88.2 | 84.2 | 60.6 | 39.2 |
| Example 154 | 99.0 | PMPT | 1.0 | 1.38 | 1 | 0.157 | 5.10 | 34.5 | 90.1 | 85.4 | 76.0 | 56.5 |
| Example 119 | 95 | PMPT | 5 | 1.38 | 0 | 0.200 | 5.03 | 34.4 | 94.0 | 92.5 | 86.0 | 61.2 |
| Example 155 | 90 | PMPT | 10 | 1.38 | 1 | 0.215 | 5.00 | 34.2 | 97.4 | 93.0 | 87.5 | 64.0 |
| Example 156 | 80 | PMPT | 20 | 1.38 | 0 | 0.220 | 4.72 | 34.1 | 97.8 | 93.4 | 89.1 | 68.0 |
| Example 157 | 60 | PMPT | 40 | 1.38 | 1 | 0.230 | 4.50 | 32.2 | 98.2 | 95.0 | 90.2 | 69.3 |
| Comp. Ex. 61 | 59 | PMPT | 41 | 1.38 | 0 | 0.231 | 3.30 | 25.2 | 98.3 | 95.4 | 90.0 | 69.5 |
| Comp. Ex. 62 | 99.9 | PMMA | 0.1 | 1.38 | 0 | 0.113 | 5.25 | 34.5 | 87.0 | 75.20 | 0*¹ | — |
| Example 158 | 99.8 | PMMA | 0.2 | 1.38 | 1 | 0.138 | 5.24 | 34.3 | 88.3 | 84.1 | 60.3 | 38.9 |
| Example 159 | 99.0 | PMMA | 1.0 | 1.38 | 1 | 0.155 | 5.20 | 34.2 | 90.0 | 85.3 | 76.0 | 55.5 |
| Example 120 | 95 | PMMA | 5 | 1.38 | 1 | 0.203 | 5.04 | 34.3 | 93.0 | 91.7 | 83.6 | 60.8 |
| Example 160 | 90 | PMMA | 10 | 1.38 | 1 | 0.212 | 4.98 | 34.1 | 97.6 | 92.6 | 87.0 | 30.6 |
| Example 161 | 80 | PMMA | 20 | 1.38 | 0 | 0.217 | 4.70 | 34.0 | 98.0 | 93.1 | 88.7 | 67.5 |
| Example 162 | 60 | PMMA | 40 | 1.38 | 0 | 0.226 | 4.48 | 32.0 | 98.2 | 94.8 | 89.6 | 68.4 |
| Comp. Ex. 63 | 59 | PMMA | 41 | 1.38 | 0 | 0.229 | 3.27 | 24.9 | 98.2 | 95.3 | 89.7 | 68.7 |
| Comp. Ex. 64 | 99.9 | ZEONEX 280 | 0.1 | 1.38 | 0 | 0.126 | 5.23 | 34.5 | 89.5 | 79.4 | 0*¹ | — |
| Example 163 | 99.8 | ZEONEX 280 | 0.2 | 1.38 | 0 | 0.150 | 5.16 | 34.3 | 90.4 | 84.6 | 64.2 | 41.6 |
| Example 164 | 99.0 | ZEONEX 280 | 1.0 | 1.38 | 1 | 0.175 | 5.14 | 34.2 | 90.0 | 86.5 | 80.4 | 59.5 |
| Example 121 | 95 | ZEONEX 280 | 5 | 1.38 | 0 | 0.220 | 5.08 | 34.4 | 97.5 | 94.3 | 89.0 | 70.0 |
| Example 165 | 90 | ZEONEX 280 | 10 | 1.38 | 0 | 0.233 | 5.02 | 34.3 | 98.2 | 94.5 | 89.9 | 69.1 |
| Example 166 | 80 | ZEONEX 280 | 20 | 1.38 | 1 | 0.236 | 4.80 | 34.2 | 98.5 | 95.5 | 90.78 | 70.6 |
| Example 167 | 60 | ZEONEX 280 | 40 | 1.38 | 1 | 0.244 | 4.55 | 33.2 | 99.1 | 96.4 | 91.0 | 72.0 |
| Comp. Ex. 65 | 59 | ZEONEX 280 | 41 | 1.38 | 0 | 0.245 | 3.43 | 25.0 | 99.1 | 97.1 | 91.0 | 72.2 |

*¹: Deterioration too great for measurement.

EXAMPLES 168–172, COMPARATIVE EXAMPLES 66 and 67

Table 15 lists the properties of polyester monofilaments obtained in the same manner as in Example 124, except that the amounts of the PET chips and PMTCDD of Example 124 were changed as listed in Table 15. Table 15 also shows the results of Comparative Example 47 and Example 124.

EXAMPLES 179–177, COMPARATIVE EXAMPLES 68 and 69

Table 15 also lists the properties of polyester monofilaments obtained in the same manner as in Example 127, except that the amounts of the PET chips and PPCPE of Example 127 were changed as listed in Table 15. Table 15 also shows the results of Example 127.

TABLE 15

| No. | Polymer composition PET (A) (wt %) | Polymer (B) Type | Polymer (B) Amt. (wt %) | TIC added (wt %) | COOH conc. of mono-filaments (eq/10⁶ g) | Unreacted TIC in mono-filaments (wt %) | Monofilament: Strength (g/d) | Monofilament: Duc-tility (%) | Strength retention upon hydrolysis of monofilaments (%) 10th day | 12th day | 15th day | 22nd day |
|---|---|---|---|---|---|---|---|---|---|---|---|---|
| Comp. Ex. 47 | 100 | — | — | 1.38 | 1 | 0.110 | 5.26 | 34.4 | 86.5 | 72.0 | 0*¹ | — |
| Comp. Ex. 66 | 99.9 | PMTCDD | 0.1 | 1.38 | 0 | 0.115 | 5.23 | 34.5 | 89.4 | 79.2 | 0*¹ | — |
| Example 168 | 99.8 | PMTCDD | 0.2 | 1.38 | 1 | 0.140 | 5.17 | 34.4 | 89.4 | 79.2 | 0*¹ | — |
| Example 169 | 99.0 | PMTCDD | 1.0 | 1.38 | 1 | 0.159 | 5.14 | 34.1 | 90.1 | 86.5 | 80.2 | 59.3 |
| Example 124 | 95 | PMTCDD | 5 | 1.38 | 0 | 0.213 | 5.03 | 34.5 | 96.1 | 94.7 | 88.4 | 65.3 |
| Example 170 | 90 | PMTCDD | 10 | 1.38 | 0 | 0.223 | 5.00 | 34.1 | 98.3 | 94.3 | 89.2 | 69.0 |
| Example 171 | 80 | PMTCDD | 0 | 1.38 | 0 | 0.230 | 4.82 | 34.3 | 98.8 | 95.7 | 90.7 | 70.3 |
| Example 172 | 60 | PMTCDD | 40 | 1.38 | 1 | 0.234 | 4.56 | 33.0 | 99.0 | 96.1 | 91.0 | 71.0 |
| Comp. Ex. 67 | 59 | PMTCDD | 41 | 1.38 | 0 | 0.236 | 3.40 | 25.1 | 99.0 | 96.7 | 91.0 | 71.4 |
| Comp. Ex. 68 | 99.9 | PPCPE | 0.1 | 1.38 | 1 | 0.126 | 5.22 | 34.5 | 89.3 | 78.0 | 0*¹ | — |
| Example 173 | 99.8 | PPCPE | 0.2 | 1.38 | 0 | 0.150 | 5.16 | 34.4 | 90.0 | 84.0 | 64.7 | 41.9 |
| Example 174 | 99.0 | PPCPE | 1.0 | 1.38 | 1 | 0.175 | 5.12 | 34.2 | 90.0 | 86.3 | 80.2 | 59.7 |
| Example 127 | 95 | PPCPE | 5 | 1.38 | 0 | 0.210 | 5.05 | 34.2 | 95.1 | 92.0 | 85.4 | 63.0 |
| Example 175 | 90 | PPCPE | 10 | 1.38 | 1 | 0.233 | 5.00 | 34.2 | 98.3 | 94.3 | 89.9 | 69.0 |

TABLE 15-continued

| | Polymer composition | | | COOH conc. | Unreacted TIC in | Monofilament: | | Strength retention upon hydrolysis of monofilaments (%) | | | |
|---|---|---|---|---|---|---|---|---|---|---|---|
| | PET | Polymer (B) | | TIC | of mono- | mono- | | Duc- | | | | |
| No. | (A) (wt %) | Type | Amt. (wt %) | added (wt %) | filaments (eq/10⁶ g) | filaments (wt %) | Strength (g/d) | tility (%) | 10th day | 12th day | 15th day | 22nd day |
| Example 176 | 80 | PPCPE | 20 | 1.38 | 1 | 0.236 | 4.79 | 34.1 | 98.3 | 95.2 | 90.7 | 70.2 |
| Example 177 | 60 | PPCPE | 40 | 1.38 | 1 | 0.244 | 4.56 | 33.2 | 99.0 | 96.1 | 91.0 | 71.8 |
| Comp. Ex. 69 | 59 | PPCPE | 41 | 1.38 | 1 | 0.245 | 3.38 | 24.9 | 99.1 | 96.2 | 91.0 | 72.0 |

*¹: Deterioration too great for measurement.

EXAMPLES 178–189, COMPARATIVE EXAMPLES 70–77

Table 16 lists the properties of polyester monofilaments obtained in the same manner as in Examples 106, 109, 116 and 117 except that the respective amounts of TIC added in Examples 106, 109, 116 and 117 were changed as listed in Table 16. Table 16 also shows the results of Examples 106, 109, 116 and 117.

TABLE 16

| | Polymer composition | | | COOH conc. | Unreacted TIC in | Monofilament: | | Strength retention upon hydrolysis of monofilaments (%) | | | |
|---|---|---|---|---|---|---|---|---|---|---|---|
| | PET | Polymer (B) | | TIC | of mono- | mono- | | Duc- | | | | |
| No. | (A) (wt %) | Type | Amt. (wt %) | added (wt %) | filaments (eq/10⁶ g) | filaments (wt %) | Strength (g/d) | tility (%) | 10th day | 12th day | 15th day | 22nd day |
| Comp. Ex. 70 | 95 | PETCD | 5 | 0.60 | 13 | 0.003 | 5.08 | 34.5 | 87.5 | 78.1 | 0*¹ | — |
| Example 178 | 95 | PETCD | 5 | 0.75 | 9 | 0.005 | 5.07 | 34.5 | 89.2 | 81.5 | 66.1 | 43.2 |
| Example 179 | 95 | PETCD | 5 | 0.85 | 6 | 0.011 | 5.08 | 34.4 | 89.3 | 84.0 | 70.2 | 50.1 |
| Example 106 | 95 | PETCD | 5 | 1.38 | 1 | 0.215 | 5.08 | 34.3 | 97.7 | 94.1 | 89.2 | 68.5 |
| Example 180 | 95 | PETCD | 5 | 3.50 | 0 | 1.415 | 4.78 | 32.0 | 98.2 | 98.8 | 91.2 | 74.5 |
| Comp. Ex. 71 | 95 | PETCD | 5 | 4.00 | 0 | 1.608 | 2.26 | 13.2 | 98.1 | 96.7 | 90.6 | 72.1 |
| Comp. Ex. 72 | 95 | APEL 6015 | 5 | 0.60 | 3 | 0.003 | 5.08 | 34.5 | 88.1 | 78.0 | 0*¹ | — |
| Example 181 | 95 | APEL 6015 | 5 | 0.75 | 9 | 0.006 | 5.08 | 34.5 | 89.3 | 82.5 | 66.5 | 44.5 |
| Example 182 | 95 | APEL 6015 | 5 | 0.85 | 5 | 0.011 | 5.08 | 34.4 | 89.2 | 84.1 | 70.3 | 51.8 |
| Example 109 | 95 | APEL 6015 | 5 | 1.38 | 1 | 0.221 | 5.08 | 34.5 | 97.8 | 94.4 | 89.9 | 70.2 |
| Example 183 | 95 | APEL 6015 | 5 | 3.50 | 1 | 1.420 | 4.75 | 31.7 | 98.5 | 97.1 | 92.0 | 75.3 |
| Comp. Ex. 73 | 95 | APEL 6015 | 5 | 4.00 | 0 | 1.605 | 2.32 | 21.0 | 98.5 | 96.9 | 91.6 | 73.2 |
| Comp. Ex. 74 | 95 | HDPE | 5 | 0.63 | 13 | 0.003 | 5.05 | 34.5 | 87.0 | 76.0 | 0*¹ | — |
| Example 184 | 95 | HDPE | 5 | 0.78 | 9 | 0.005 | 5.06 | 34.5 | 88.5 | 81.0 | 65.4 | 44.0 |
| Example 185 | 95 | HDPE | 5 | 0.88 | 6 | 0.011 | 5.05 | 34.5 | 89.1 | 84.0 | 70.0 | 50.1 |
| Example 116 | 95 | HDPE | 5 | 1.38 | 1 | 0.200 | 5.04 | 34.5 | 97.2 | 92.9 | 87.1 | 63.1 |
| Example 186 | 95 | HDPE | 5 | 3.55 | 0 | 1.420 | 4.67 | 31.1 | 97.9 | 97.1 | 90.0 | 73.3 |
| Comp. Ex. 75 | 95 | HDPE | 5 | 4.05 | 0 | 1.599 | 2.00 | 19.1 | 98.1 | 96.8 | 90.6 | 73.0 |
| Comp. Ex. 76 | 95 | PP | 5 | 0.63 | 13 | 0.003 | 5.05 | 34.4 | 87.1 | 76.5 | 0*¹ | — |
| Example 187 | 95 | PP | 5 | 0.78 | 9 | 0.006 | 5.05 | 34.4 | 88.1 | 82.0 | 64.4 | 44.2 |
| Example 188 | 95 | PP | 5 | 0.88 | 5 | 0.011 | 5.05 | 34.5 | 88.7 | 84.1 | 70.5 | 51.1 |
| Example 117 | 95 | PP | 5 | 1.38 | 0 | 0.202 | 5.05 | 34.4 | 94.2 | 91.0 | 86.4 | 61.5 |
| Example 189 | 95 | PP | 5 | 3.55 | 0 | 1.415 | 4.66 | 31.0 | 98.1 | 97.2 | 90.3 | 73.5 |
| Comp. Ex. 77 | 95 | PP | 5 | 4.05 | 0 | 1.595 | 2.06 | 20.2 | 98.0 | 96.9 | 90.1 | 73.1 |

*¹: Deterioration too great for measurement.

EXAMPLES 190–198, COMPARATIVE EXAMPLES 78–83

Table 17 lists the properties of polyester monofilaments obtained in the same manner as in Examples 118–120 except that the respective amounts of TIC added in Examples 118–120 were changed as listed in Table 17. Table 17 also shows the results of Examples 118–120.

TABLE 17

| No. | Polymer composition PET (A) (wt %) | Polymer (B) Type | Polymer (B) Amt. (wt %) | TIC added (wt %) | COOH conc. of mono-filaments (eq/10^6 g) | Unreacted TIC in mono-filaments (wt %) | Monofilament: Strength (g/d) | Monofilament: Duc-tility (%) | Strength retention upon hydrolysis of monofilaments (%) 10th day | 12th day | 15th day | 22nd day |
|---|---|---|---|---|---|---|---|---|---|---|---|---|
| Comp. Ex. 78 | 95 | PS | 5 | 0.63 | 13 | 0.003 | 5.05 | 34.4 | 87.3 | 76.7 | 0*1 | — |
| Example 190 | 95 | PS | 5 | 0.78 | 9 | 0.006 | 5.05 | 34.4 | 88.2 | 82.2 | 64.9 | 44.5 |
| Example 191 | 95 | PS | 5 | 0.88 | 5 | 0.011 | 5.05 | 34.5 | 89.2 | 84.5 | 70.7 | 51.8 |
| Example 118 | 95 | PS | 5 | 1.38 | 1 | 0.203 | 5.04 | 34.1 | 95.0 | 92.3 | 86.9 | 62.8 |
| Example 192 | 95 | PS | 5 | 3.55 | 0 | 1.414 | 4.66 | 31.0 | 98.2 | 97.3 | 90.2 | 73.6 |
| Comp. Ex. 79 | 95 | PS | 5 | 4.05 | 0 | 1.595 | 2.06 | 20.2 | 98.1 | 97.0 | 90.2 | 73.5 |
| Comp. Ex. 80 | 95 | PMPT | 5 | 0.63 | 13 | 0.003 | 5.06 | 34.3 | 86.7 | 75.5 | 0*1 | — |
| Example 193 | 95 | PMPT | 5 | 0.78 | 9 | 0.006 | 5.04 | 34.3 | 87.4 | 81.1 | 63.7 | 43.4 |
| Example 194 | 95 | PMPT | 5 | 0.88 | 6 | 0.011 | 5.03 | 34.3 | 88.5 | 83.1 | 69.6 | 51.0 |
| Example 119 | 95 | PMPT | 5 | 1.38 | 0 | 0.200 | 5.03 | 34.4 | 94.0 | 92.5 | 86.0 | 61.2 |
| Example 195 | 95 | PMPT | 5 | 3.55 | 1 | 1.420 | 4.64 | 31.0 | 98.1 | 97.0 | 88.8 | 71.9 |
| Comp. Ex. 81 | 95 | PMPT | 5 | 4.05 | 0 | 1.604 | 2.10 | 20.0 | 98.2 | 97.0 | 88.9 | 71.7 |
| Comp. Ex. 82 | 95 | PMMA | 5 | 0.63 | 13 | 0.003 | 5.04 | 34.4 | 86.5 | 74.3 | 0*1 | — |
| Example 196 | 95 | PMMA | 5 | 0.78 | 9 | 0.005 | 5.04 | 34.4 | 87.0 | 81.2 | 62.1 | 41.2 |
| Example 197 | 95 | PMMA | 5 | 0.88 | 6 | 0.011 | 5.03 | 34.3 | 88.1 | 82.8 | 68.5 | 50.1 |
| Example 120 | 95 | PMMA | 5 | 1.38 | 1 | 0.203 | 5.04 | 34.0 | 93.0 | 91.7 | 83.6 | 56.8 |
| Example 189 | 95 | PMMA | 5 | 3.55 | 1 | 1.420 | 4.63 | 30.5 | 98.0 | 96.6 | 88.0 | 69.1 |
| Comp. Ex. 83 | 95 | PMMA | 5 | 4.05 | 0 | 1.600 | 2.01 | 19.6 | 98.0 | 96.7 | 88.5 | 70.0 |

*1: Deterioration too great for measurement.

EXAMPLES 199–207, COMPARATIVE EXAMPLES 84–89

Table 18 lists the properties of polyester monofilaments obtained in the same manner as in Examples 121, 124 and 127 except that the respective amounts of TIC added in Examples 121, 124 and 127 were changed as listed in Table 18. Table 18 also shows the results of Examples 121, 124 and 127.

TABLE 18

| No. | Polymer composition PET (A) (wt %) | Polymer (B) Type | Polymer (B) Amt. (wt %) | TIC added (wt %) | COOH conc. of mono-filaments (eq/10^6 g) | Unreacted TIC in mono-filaments (wt %) | Monofilament: Strength (g/d) | Monofilament: Duc-tility (%) | Strength retention upon hydrolysis of monofilaments (%) 10th day | 12th day | 15th day | 22nd day |
|---|---|---|---|---|---|---|---|---|---|---|---|---|
| Comp. Ex. 84 | 95 | ZEONEX 280 | 5 | 0.60 | 13 | 0.003 | 5.08 | 34.4 | 88.0 | 77.1 | 0*1 | — |
| Example 199 | 95 | ZEONEX 280 | 5 | 0.75 | 9 | 0.005 | 5.08 | 34.3 | 88.3 | 82.6 | 66.6 | 45.5 |
| Example 200 | 95 | ZEONEX 280 | 5 | 0.85 | 6 | 0.011 | 5.08 | 34.4 | 89.6 | 84.5 | 71.3 | 52.1 |
| Example 121 | 95 | ZEONEX 280 | 5 | 1.38 | 0 | 0.220 | 5.08 | 34.4 | 97.5 | 94.3 | 89.0 | 70.0 |
| Example 201 | 95 | ZEONEX 280 | 5 | 3.50 | 0 | 1.411 | 4.75 | 31.0 | 98.1 | 97.2 | 91.9 | 75.2 |
| Comp. Ex. 85 | 95 | ZEONEX 280 | 5 | 4.00 | 0 | 1.600 | 2.34 | 20.0 | 98.5 | 96.9 | 90.6 | 73.1 |
| Comp. Ex. 86 | 95 | PMTCDD | 5 | 0.60 | 13 | 0.003 | 5.07 | 34.5 | 87.1 | 78.7 | 0*1 | — |
| Example 202 | 95 | PMTCDD | 5 | 0.75 | 9 | 0.006 | 5.07 | 34.4 | 89.0 | 81.6 | 66.3 | 43.9 |
| Example 203 | 95 | PMTCDD | 5 | 0.85 | 6 | 0.011 | 5.08 | 34.4 | 89.1 | 84.5 | 71.3 | 52.1 |
| Example 124 | 95 | PMTCDD | 5 | 1.38 | 0 | 0.213 | 5.03 | 34.5 | 96.1 | 94.7 | 88.4 | 65.3 |
| Example 204 | 95 | PMTCDD | 5 | 3.50 | 1 | 1.420 | 4.75 | 32.1 | 97.3 | 97.8 | 91.11 | 74.0 |
| Comp. Ex. 87 | 95 | PMTCDD | 5 | 4.00 | 0 | 1.604 | 2.21 | 15.4 | 98.1 | 97.7 | 90.2 | 72.6 |
| Comp. Ex. 88 | 95 | PPCPE | 5 | 0.60 | 13 | 0.003 | 5.08 | 34.4 | 87.0 | 78.1 | 0*1 | — |
| Example 205 | 95 | PPCPE | 5 | 0.75 | 9 | 0.005 | 5.07 | 34.5 | 88.9 | 81.4 | 66.1 | 43.6 |
| Example 206 | 95 | PPCPE | 5 | 0.85 | 6 | 0.011 | 5.07 | 34.4 | 89.2 | 84.1 | 70.1 | 50.1 |
| Example 127 | 95 | PPCPE | 5 | 1.38 | 0 | 0.210 | 5.05 | 34.2 | 95.1 | 92.0 | 85.4 | 63.0 |
| Example 207 | 95 | PPCPE | 5 | 3.50 | 1 | 1.420 | 4.68 | 31.3 | 98.0 | 96.8 | 89.2 | 74.5 |
| Comp. Ex. 89 | 95 | PPCPE | 5 | 4.00 | 0 | 1.600 | 2.16 | 15.0 | 98.1 | 95.7 | 89.1 | 73.2 |

*1: Deterioration too great for measurement.

EXAMPLE 208

Table 19 lists the properties of a polyester monofilament obtained in the same manner as in Example 106 except that the TIC in Example 106 was replaced with OTC.

COMPARATIVE EXAMPLE 90

Table 19 also shows the properties of a polyester monofilament obtained in the same manner as in Example 208, except that the PETCD in Example 208 was not included in the blend.

TABLE 19

| No. | Polymer composition PET (A) (wt %) | Polymer (B) Type | Polymer (B) Amt. (wt %) | Carbodiimide compound Type | Carbodiimide compound Amt (wt %) | COOH conc. of mono-filaments (eq/$10^6$ g) | Content of unreacted OTC in mono-filaments (wt %) | Monofilament: Strength (g/d) | Monofilament: Duc-tility (%) | Strength retention upon hydrolysis of monofilaments (%) 10th day | 12th day | 15th day | 22nd day |
|---|---|---|---|---|---|---|---|---|---|---|---|---|---|
| Example 208 | 95 | PETCD | 5 | OTC | 1.3 | 1 | 0.160 | 5.08 | 34.2 | 89.2 | 78.9 | 62.3 | 48.5 |
| Comp. Ex. 90 | 100 | — | 5 | OTC | 1.3 | 1 | 1.108 | 5.28 | 35.5 | 86.3 | 47.0 | 0*[1] | — |

*[1]: Deterioration too great for measurement.

EXAMPLE 209

Five parts by weight of PETCD chips and 1.38 parts by weight of TIC were mixed and kneaded for about 3 minutes at 260° C. in a single screw extruder and then extruded from the end of the extruder into a gut and cooled, after which a cutting method was applied to obtain PETCD chips containing 21.63 wt % of TIC (hereunder, "TIC+PETCD master pellets").

Next, 95 parts by weight of PET chips and 6.38 parts by weight of the TIC+PETCD master pellets were weighed out while they were fed to a single screw extruder via the hopper and a polymer tube below the hopper of the single screw extruder, and were kneaded at about 285° C. for 3 minutes in the single screw extruder, otherwise following the method of Example 106 to obtain a polyester monofilament by the master pellet process, with the properties listed in Table 20. Table 20 also shows the results for a monofilament obtained by the extruder process in Example 106.

EXAMPLE 210

Table 20 also lists the properties of a polyester monofilament obtained by the master pellet process in the same manner as in Example 209 except that the TIC+PETCD master pellets in Example 209 were replaced with 1.3 parts by weight of OTC. Table 20 also lists the results for a monofilament obtained by the extruder process in Example 208.

TABLE 20

| No. | Process for producing polymer composition | Carbodiimide compound Type | Carbodiimide compound Amt (wt %) | COOH conc. of mono-filaments (eq/$10^6$ g) | Unreacted carbodi-imide in mono-filaments (wt %) | Monofilament: Strength | Monofilament: Duc-tility (%) | Strength retention upon hydrolysis of monofilaments (%) 10th day | 12th day | 15th day | 22nd day |
|---|---|---|---|---|---|---|---|---|---|---|---|
| Example 209 | Master pellet process | TIC | 1.38 | 0 | 0.220 | 5.08 | 34.3 | 97.6 | 94.1 | 90.5 | 71.2 |
| Example 106 | Extruder process | TIC | 1.38 | 1 | 0.215 | 5.08 | 34.3 | 97.7 | 94.1 | 89.2 | 68.5 |
| Example 210 | Master pellet process | OTC | 1.3 | 0 | 0.165 | 5.08 | 34.1 | 89.3 | 78.6 | 63.6 | 50.2 |
| Example 208 | Extruder process | OTC | 1.3 | 1 | 0.160 | 5.08 | 34.2 | 89.2 | 78.9 | 62.3 | 48.5 |

EXAMPLE 211

Monofilaments obtained in Example 106 were used as warp and weft to prepare a paper drier twill weave canvas. This canvas was mounted on the drier of a neutral paper paper making machine, and after 1 year of paper drying at 140° C., the canvas was taken off. The strength retention of the warp of this used canvas is shown in Table 21.

COMPARATIVE EXAMPLE 91

Monofilaments obtained in Comparative Example 47 were used as warp and weft to prepare a paper drier twill weave canvas for a paper drier. This canvas was mounted on the drier of a neutral paper paper making machine, and after 1 year of paper drying at 140° C., the canvas was taken off. The strength retention of the warp of this used canvas is shown in Table 21.

EXAMPLES 212-220

Table 21 also shows the strength retentions of monofilaments treated in the same manner as in Example 211, except that the monofilaments composing the paper drier twill weave canvas of Example 211 were replaced with the monofilaments obtained in Example 109 (Example 212) and the monofilaments obtained in Examples 116–121, 124 and 127 (Examples 213–220).

TABLE 21

| No. | Monofilaments of paper drier canvas | Strength retenti of monofilaments after 1 year use |
|---|---|---|
| Comp. Ex. 91 | Monofilaments obtained in Comp. Ex. 46 | 42 |
| Example 211 | Monofilaments obtained in Example 106 | 84 |
| Example 212 | Monofilaments obtained in Example 109 | 87 |
| Example 213 | Monofilaments obtained in Example 121 | 86 |
| Example 214 | Monofilaments obtained in Example 116 | 79 |
| Example 215 | Monofilaments obtained in Example 117 | 82 |
| Example 216 | Monofilaments obtained in Example 118 | 82 |
| Example 217 | Monofilaments obtained in Example 119 | 80 |
| Example 218 | Monofilaments obtained in Example 120 | 75 |
| Example 219 | Monofilaments obtained in Example 124 | 84 |
| Example 220 | Monofilaments obtained in Example 127 | 84 |

EXAMPLES 221-230, COMPARATIVE EXAMPLE 92

Polyester monofilaments obtained in Examples 106, 109, 116–121, 124 and 127 were subjected to the following treatment with an adhesive agent.

[Adhesive agent treatment]

Thirteen parts by weight of a 1% sodium hydroxide solution, 16.6 parts by weight of resorcin, 15 parts by weight of 37% formalin and 205 parts by weight of water were mixed and allowed to age at 25° C. for 4 hours, after which 100 parts by weight of Pyratex (trademark) (41% styrene-butadiene-vinyl pyridine copolymer latex, product of Sumitomo Nogatakku Co.) was added and the mixture was allowed to age at 25° C. for 30 hours, to obtain an RFL aqueous solution. To this RFL aqueous solution there was added 110 parts by weight of Barcabond (trademark) E (aqueous ammonia solution containing 20% p-chlorophenol-resorcin-formalin concentrate, product of Barnax Co.) to obtain an adhesive solution in which the monofilaments were immersed for 5 seconds, after which they were dried at 100° C. for 3 minutes and subjected to heat treatment at 250° C. for 1 minute.

The obtained adhesive-treated monofilaments were buried in the uncured rubber composition listed below and cured at 170° C., 50 kg/cm$^2$ for 3 hours, after which the monofilaments were taken out of the rubber and the strength retention thereof determined, as listed in Table 22. Table 22 also shows the results for the monofilaments obtained in

COMPARATIVE EXAMPLE 47

| Natural rubber | 70 parts by weight |
|---|---|
| SBR (Styrene-butadiene rubber) | 30 parts by weight |
| Zinc oxide | 3.5 parts by weight |
| Stearic acid | 1.5 parts by weight |
| Carbon black | 35 parts by weight |
| Processing oil | 3.5 parts by weight |
| Sulfur | 2.5 parts by weight |
| Dibenzothiazole disulfide | 1 part by weight |

TABLE 22

| No. | PET (A) (wt. %) | Polymer composition Type | Amt. (wt %) | TIC added (wt %) | COOH conc. of mono-filaments (eq/10$^6$ g) | Unreacted TIC in mono-filaments (wt %) | Strength retention of monofilaments after 3 hours' treatment in rubber (%) |
|---|---|---|---|---|---|---|---|
| Comp. Ex. 92 | 100 | — | 5 | 1.38 | 1 | 0.110 | 67 |
| Example 221 | 95 | PETCD | 5 | 1.38 | 1 | 0.215 | 89 |
| Example 222 | 95 | APEL 6015 | 5 | 1.38 | 1 | 0.221 | 92 |
| Example 223 | 95 | HDPE | 5 | 1.38 | 1 | 0.200 | 82 |

TABLE 22-continued

| No. | PET (A) (wt. %) | Polymer composition Type | Amt. (wt %) | TIC added (wt %) | COOH conc. of mono-filaments (eq/$10^6$ g) | Unreacted TIC in mono-filaments (wt %) | Strength retention of monofilaments after 3 hours' treatment in rubber (%) |
|---|---|---|---|---|---|---|---|
| Example 224 | 95 | PP | 5 | 1.38 | 0 | 0.202 | 83 |
| Example 225 | 95 | PS | 5 | 1.38 | 1 | 0.203 | 84 |
| Example 226 | 95 | PMPT | 5 | 1.38 | 0 | 0.200 | 82 |
| Example 227 | 95 | PMMA | 5 | 1.38 | 1 | 0.203 | 78 |
| Example 228 | 95 | ZEONEX 280 | 5 | 1.38 | 0 | 0.220 | 91 |
| Example 229 | 95 | PMTCDD | 5 | 1.38 | 0 | 0.213 | 88 |
| Example 230 | 95 | PPCPE | 5 | 1.38 | 0 | 0.210 | 86 |

INDUSTRIAL APPLICABILITY

The polyester composition and polyester monofilaments of the present invention may be used in various industrial parts, structural materials and industrial-grade fabrics for their excellent resistance to hydrolysis. Furthermore, paper drier canvases and rubber molds which employ polyester monofilaments of the present invention experience little reduction in strength upon use, and thus have advantages due to their prolonged service life.

We claim:

1. A polyester composition consisting essentially of:
   (A) 99.8–60 wt % of a polyester comprising the reaction product of a dicarboxylic acid and a glycol, said polyester having a terminal carboxyl group concentration of 10 equivalents per $10^6$ grams, or less;
   (B) 0.2–40 wt % of a thermoplastic polymer which is not a reaction product of a dicarboxylic acid and a glycol and which contains no fluorine atoms, and
   (C) 0.005–1.5 wt % of an unreacted carbodiimide compound.

2. A composition according to claim 1, wherein the thermoplastic polymer containing no fluorine atoms (B) is at least one selected from the group consisting of polyolefins, polystyrenes and polymethacrylate polymers.

3. A composition according to claim 2, wherein the polyolefin is selected from cyclic olefin polymers, polypropylene, polyethylene and polymethylpentene.

4. A composition according to claim 3, wherein the cyclic olefin polymer is a random copolymer of an α-olefin having 2 or more carbon atoms, and at least one cyclic olefin represented by the following general formula [I] or [II]

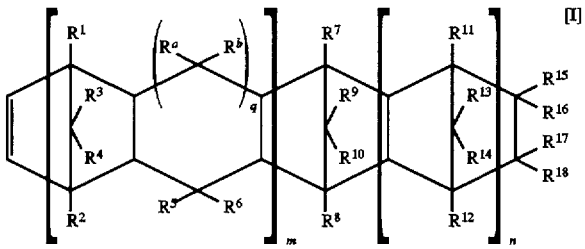

where n is 0 or 1, m is 0 or a positive integer, q is 0 or 1 and $R^1$–$R^{18}$, $R^a$ and $R^b$ each independently represent an atom or group selected from the group consisting of hydrogen atoms, chlorine atoms, bromine atoms and hydrocarbons, $R^{15}$–$R^{18}$ may be mutually attached to form a monocycle or polycycle which may contain double bonds, and $R^{15}$ and $R^{16}$ or $R^{17}$ and $R^{18}$ may form an alkylidene a group

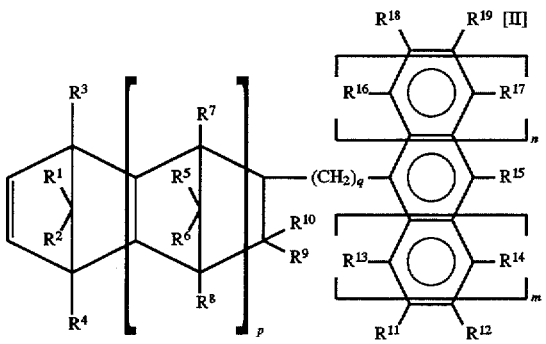

wherein p and q are each integers of 0, 1 or more, m and n are each 0, 1 or 2 and $R^1$–$R^{19}$ each independently represent an atom or group selected from the group consisting of hydrogen atoms, chlorine atoms, bromine atoms, aliphatic hydrocarbons, alicyclic hydrocarbons, aromatic hydrocarbons and alkoxy groups, the carbon atom to which $R^9$ is attached and the carbon atom to which $R^{13}$ is attached, or the carbon atom to which $R^{10}$ is attached and the carbon atom to which $R^{11}$ is attached may be attached either directly or via an alkylene group of 1–3 carbon atoms, and when n=m=0, $R^{15}$ and $R^{12}$ or $R^{15}$ and $R^{19}$ may be mutually attached to form a monocyclic or polycyclic aromatic ring.

5. A composition according to claim 4, wherein the α-olefin of 2 or more carbon atoms is ethylene.

6. A composition according to claim 3, wherein the cyclic olefin polymer is an open-ring polymer or open-ring copolymer of at least one type of cyclic olefin represented by one of the following general formulas [III] or [IV], or a hydrogenated product thereof

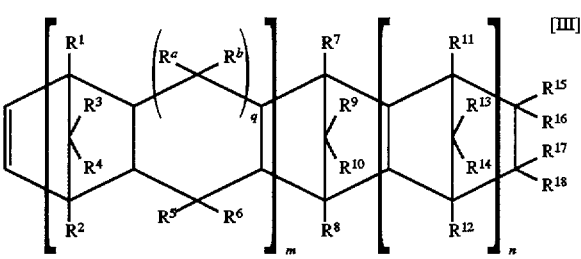

where n is 0 or 1, m is 0 or a positive integer, q is 0 or 1, and $R^1$–$R^{18}$, $R^a$ and $R^b$ each independently represent an atom or group selected from the group consisting of hydrogen atoms, chlorine atoms, bromine atoms and hydrocarbons, wherein $R^{15}$–$R^{18}$ may be mutually attached to form a monocycle or polycycle which may contain a double bond, $R^{15}$ and $R^{16}$ or $R^{17}$ and $R^{18}$ may form an alkylidene group, or $R^{16}$ and $R^{17}$ may each independently be groups represented by the following formulas

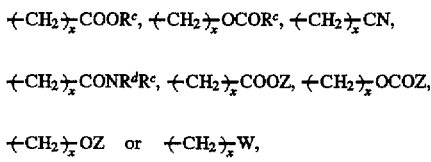

where $R^c$, $R^d$ and $R^e$ represent hydrocarbons of 1–20 carbon atoms, Z represents a hydrocarbon or a chlorine- or bromine-substituted hydrocarbon, W represents $SiR^g_p D_{3-p}$ (where $R^g$ represents a hydrocarbon of 1–10 carbon atoms, D represents a chlorine atom, bromine atom or —$OCOR^h$ ($R^h$ is a hydrocarbon of 1–10 carbon atoms) and p is an integer of 0–3), and x is an integer of 0–10, or $R^{16}$ and $R^{17}$ may form a group represented by the following formula

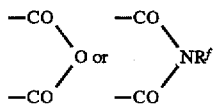

where $R^f$ represents a hydrocarbon of 1–20 carbon atoms

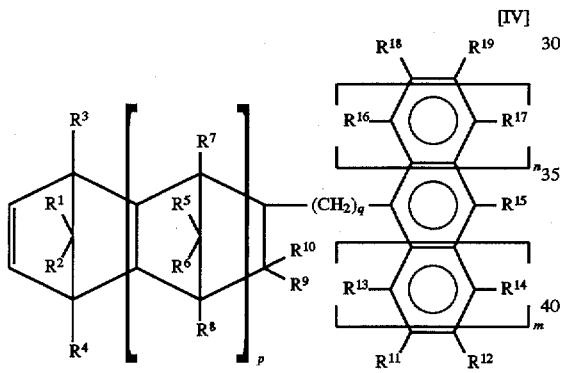

where p and q are each integers of 0, 1 or more, m and n are each 0, 1 or 2 and $R^1$–$R^{19}$ each independently represent an atom or group selected from the group consisting of hydrogen atoms, chlorine atoms, bromine atoms, aliphatic hydrocarbons, alicyclic hydrocarbons, aromatic hydrocarbons and alkoxy groups, the carbon atom to which $R^9$ is attached and the carbon atom to which $R^{13}$ is attached, or the carbon atom to which $R^{10}$ is attached and the carbon atom to which $R^{11}$ is attached may be attached either directly or via an alkylene group of 1–3 carbon atoms, and when n=m=0, $R^{15}$ and $R^{12}$ or $R^{15}$ and $R^{19}$ may be mutually attached to form a monocyclic or polycyclic aromatic ring.

7. A composition according to claim 1, wherein the content of the carbodiimide compound (C) is from 0.01 to 1.5 percent by weight.

8. A composition according to claim 1, wherein the carbodiimide compound (C) is N,N'-di-2,6-diisopropylphenylcarbodiimide.

9. A composition according to claim 1, wherein the polyester with a terminal carboxyl group concentration of not more than 10 equivalents/$10^6$ g (A) is polyethylene terephthalate.

10. A process for producing a polyester composition whose polymer component contains 99.8–60 wt % of a polyester with a terminal carboxyl group concentration of not more than 10 equivalents/$10^6$ g (A) and 0.2–40 wt % of a thermoplastic polymer containing no fluorine atoms (B), and whose polymer component also includes 0.005–1.5 wt % of unreacted carbodiimide compound (C), which method comprises melting and kneading the polyester either after or during the process of melting and kneading the thermoplastic polymer containing no fluorine atoms and the carbodiimide compound.

11. The process of claim 10, wherein the thermoplastic polymer containing no fluorine atoms (B) is at least one selected from the group consisting of polyolefins, polystyrenes and polymethacrylate polymers.

12. Polyester monofilaments containing a polyester composition according to claim 1.

13. A process for producing polyester monofilaments which comprises spinning, drawing and thermosetting a polyester composition according to claim 1.

14. An industrial fabric containing polyester monofilaments according to claim 12 as either or both the warp and weft composing the fabric.

15. An industrial fabric according to claim 14 which is a paper drier canvas.

16. A rubber mold reinforced with polyester monofilaments according to claim 12.

* * * * *

UNITED STATES PATENT AND TRADEMARK OFFICE
CERTIFICATE OF CORRECTION

PATENT NO. : 5,686,552
DATED : 11/11/97
INVENTOR(S) : Toyohiko Masuda, et al

It is certified that error appears in the above-indentified patent and that said Letters Patent is hereby corrected as shown below:

Page 1 of 5

Column 2, line 56, please insert --the-- after "way".

Column 5, line 62, please change "$[4.3.0\ 1^{2.5}]$" to --$[4.3.0.1^{2.5}]$-- at both occurrences; and line 63, please change "$[4.4\ 0.1^{2.5}$" to --$[4.4.0.1^{2.5}]$--.

Column 10, at approximately lines 60 to 65, please delete the benzene ring and the line below it identified as "8-fluorotetracyclo$[4.4.0.1^{2.5}.1^{7.10}]$-3-dodecene".

Column 29, line 61, please delete "5" after "at".

Column 30, line 61, please change "$[7.4.0.1^{9.12}.1^{9.12}.0^{8.13}]$" to -- $[7.4.0.1^{2.5}.1^{9,12}.0^{8,13}]$ --.

Column 31, table 1, at the heading "Polymer composition", at the subheading "PET(A) (wt.%)", at "Example 21", please change "45" to --95--;

at the heading "Polymer composition", at the subheading "Polymer (B), Type", at "Example 2", please change "PHPhEH" to --PHPhBH--; and at the heading "TIC added", at "Example 18", please change "1638" to --1.38--.

UNITED STATES PATENT AND TRADEMARK OFFICE
CERTIFICATE OF CORRECTION

PATENT NO. : 5,686,552
DATED : 11/11/97
INVENTOR(S) : Toyohiko Masuda, et al

It is certified that error appears in the above-indentified patent and that said Letters Patent is hereby corrected as shown below:

Page 2 of 5

Column 43, at table 11, at the heading "TIC" and the subheading "added (wt. %)", at "Example 117", please change "1..38" to --1.38--.

Column 45, at table 12, at the heading "Strength retention upon hydrolysis of monofilaments", at the subheading "10th" at "Example 130", please change "91.1 to --98.1--, and at "Example 132, also at the subheading "10th", please change "98.4" to --98.9--.

Column 50, at table 14, at the heading "Strength retention upon hydrolysis of monofilaments (%)", at the subheading "12th day", at " Comp. Ex. 62", please change "75.20" to --75.2--;

at the subheading "22nd day", at "Example 120", please change "60.8" to --56.8--; and at "Example 160", please change "30.6" to --63.6--.

Column 50, at approximately line 34, please change "EXAMPLES 179-177" to --EXAMPLES 173-177--.

UNITED STATES PATENT AND TRADEMARK OFFICE
CERTIFICATE OF CORRECTION

PATENT NO. : 5,686,552
DATED : 11/11/97
INVENTOR(S) : Toyohiko Masuda, et al

It is certified that error appears in the above-indentified patent and that said Letters Patent is hereby corrected as shown below:

Page 3 of 5

Column 49, at table 15, at the heading "Polymer composition", at the subheading "Amt. (wt.%)", at "Example 171", please change "0" to --20--;

at the heading "Monofilament:", at the subheading "Ductility (%)", at "Example 175", please change "34.2" to --34.1--;

at the subheading "Strength retention upon hydrolysis of monofilaments (%)" at the subheading "12th day", at "Example 168", please change "79.2" to --64.0--.

at the subheading "15th day", at "Example 168", please change "0" to --64.4--; and at the subheading "22nd day", at "Example 168", please change "__" to --42.1--.

Column 52, at table 15-continued, heading "Monofilament:", at the subheading "Ductility (%)", at "Example 176", please change "34.1" to --34.2--; and at the subheading "Strength retention upon hydrolysis of monofilaments (%)" subheading "10th day", at "Example 176", please change "98.3" to --98.55--.

UNITED STATES PATENT AND TRADEMARK OFFICE
CERTIFICATE OF CORRECTION

PATENT NO. : 5,686,552
DATED : 11/11/97
INVENTOR(S) : Toyohiko Masuda, et al

It is certified that error appears in the above-indentified patent and that said Letters Patent is hereby corrected as shown below:

Page 4 of 5

Column 51, at table 16, at heading "COOH conc. of monofilaments (eg/$10^6$g)" at "Comp. Ex. 72", please change "3" to --13--.

Column 52, at table 16, at the heading "Monofilament:" at the subheading "Ductility (%)", at "Comp. Ex.71", please change "13.2" to --15.2--.

Column 53, at table 17, heading "Polymer composition", at the subheading "No.", please change "Example 189" to --Example 198--.

Column 59, at line 63, please change "group" to --a group--, first occurrence.

Column 60, line 35, please change "group" to --a group--, first occurrence;

line 46, please change "of" to --having--; and line 64, please change "or" to --or a--.

UNITED STATES PATENT AND TRADEMARK OFFICE
CERTIFICATE OF CORRECTION

PATENT NO. : 5,686,552
DATED : 11/11/97
INVENTOR(S) : Toyohiko Masuda, et al

It is certified that error appears in the above-indentified patent and that said Letters Patent is hereby corrected as shown below:

Column 62, at line 25, please insert --(A)-- after "polyester";

line 27, please insert --(B)-- after "atoms";

line 28, please insert --(C)-- after "compound"; and line 41, please change "the" to --a--.

Signed and Sealed this

Seventh Day of July, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,686,552
DATED : November 11, 1997
INVENTOR(S) : Toyohiko Masuda, et al It is certified that error appears in the above-indentified patent and that said Letters Patent is hereby corrected as shown below:

Column 49, at table 15, at the subheading "15th day", at "Example 168" please change "$0^{*1}$" to --64.0--.

Signed and Sealed this

Twenty-first Day of November, 2000

Attest:

Q. TODD DICKINSON

*Attesting Officer*  *Director of Patents and Trademarks*